US012613394B2

(12) United States Patent
Angel et al.

(10) Patent No.: US 12,613,394 B2
(45) Date of Patent: Apr. 28, 2026

(54) ACTIVELY FOCUSED LIGHTWEIGHT HELIOSTAT

(71) Applicant: Arizona Board of Regents on Behalf of the University of Arizona, Tucson, AZ (US)

(72) Inventors: James Roger P. Angel, Tucson, AZ (US); Nicholas J. Didato, Tucson, AZ (US); Ryker Eads, Tucson, AZ (US); Matthew Rademacher, Tucson, AZ (US); Nicholas Emerson, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 840 days.

(21) Appl. No.: 17/764,030

(22) PCT Filed: Sep. 28, 2020

(86) PCT No.: PCT/US2020/053130
§ 371 (c)(1),
(2) Date: Mar. 25, 2022

(87) PCT Pub. No.: WO2021/062391
PCT Pub. Date: Apr. 1, 2021

(65) Prior Publication Data
US 2022/0350109 A1    Nov. 3, 2022

Related U.S. Application Data

(60) Provisional application No. 62/906,436, filed on Sep. 26, 2019.

(51) Int. Cl.
*G02B 7/183* (2021.01)
*F24S 23/70* (2018.01)

(52) U.S. Cl.
CPC .............. *G02B 7/183* (2013.01); *F24S 23/70* (2018.05); *F24S 23/82* (2018.05)

(58) Field of Classification Search
CPC ............ G02B 7/183; F24S 23/70; F24S 23/82
(Continued)

(56) References Cited

U.S. PATENT DOCUMENTS 260,657 A * 7/1882 Calver
4,111,184 A * 9/1978 Fletcher ................ F24S 30/452
136/246

(Continued)

FOREIGN PATENT DOCUMENTS

WO     2012/083374 A1     6/2012
WO     2012/139169 A1     10/2012
(Continued)

OTHER PUBLICATIONS

Chong, "Optical analysis for simplified astigmatic correction of non-imaging focusing heliostat," Sol. Energy, (2010), vol. 84(8), pp. 1356-1365.

*Primary Examiner* — Ricky D Shafer
(74) *Attorney, Agent, or Firm* — Venable LLP; Henry J. Daley; Ryan T. Ward

(57) ABSTRACT

A heliostat includes a reflecting surface: an elastically deformable frame on which the reflecting surface is mounted: a truss structure behind the elastically deformable frame that includes at least four bracing struts with first ends attached to the elastically deformable frame and second ends attached to at least one node located centrally behind the frame: at least one actuator connected to at least one of the at least four struts at the at least one node: an electronic control system configured to communicate with the least one actuator; and a dual-axis mount to support and orient the above assembly. The actuation of the at least one actuator in response to the electronic control system causes compres- (Continued)

sion or tension of at least one of the at least four bracing struts to thereby control a shape of the reflecting surface and the elastically deformable frame in at least low order bending modes.

16 Claims, 14 Drawing Sheets

(58) Field of Classification Search
USPC ................................ 359/849; 353/3; 126/696
See application file for complete search history.

(56) References Cited

U.S. PATENT DOCUMENTS

| | | | | | |
|---|---|---|---|---|---|
| 4,459,972 | A | | 7/1984 | Moore | |
| 4,483,118 | A | * | 11/1984 | Betschart | E04C 3/08 |
| | | | | | 403/171 |
| 5,787,878 | A | * | 8/1998 | Ratliff, Jr. | F24S 23/70 |
| | | | | | 126/606 |
| 7,203,004 | B2 | * | 4/2007 | Zhang | F24S 23/77 |
| | | | | | 359/593 |
| 8,887,470 | B2 | * | 11/2014 | Werner | F24S 25/30 |
| | | | | | 126/600 |
| 9,212,831 | B2 | | 12/2015 | Abascal et al. | |
| 9,454,001 | B2 | | 9/2016 | Lehmann et al. | |
| 9,746,127 | B2 | * | 8/2017 | Angel | F24S 30/452 |
| 12,345,446 | B2 | * | 7/2025 | Eads | H02S 40/22 |
| 2011/0017204 | A1 | | 1/2011 | Gobel | |
| 2011/0056484 | A1 | * | 3/2011 | Rogers | F24S 30/458 |
| | | | | | 126/600 |
| 2011/0235025 | A1 | * | 9/2011 | Blumenthal | F24S 25/632 |
| | | | | | 356/138 |
| 2013/0242424 | A1 | * | 9/2013 | Kato | G02B 23/165 |
| | | | | | 359/846 |
| 2015/0000278 | A1 | * | 1/2015 | Furutani | F24S 30/452 |
| | | | | | 126/607 |
| 2015/0015975 | A1 | | 1/2015 | Huss et al. | |
| 2015/0323772 | A1 | | 11/2015 | Serrano Gallar et al. | |
| 2016/0298804 | A1 | * | 10/2016 | Landman | H02S 20/30 |
| 2017/0369355 | A1 | | 12/2017 | Angel et al. | |

FOREIGN PATENT DOCUMENTS

| | | |
|---|---|---|
| WO | 2015/150445 A2 | 10/2015 |
| WO | 2019/136136 A1 | 7/2019 |

* cited by examiner

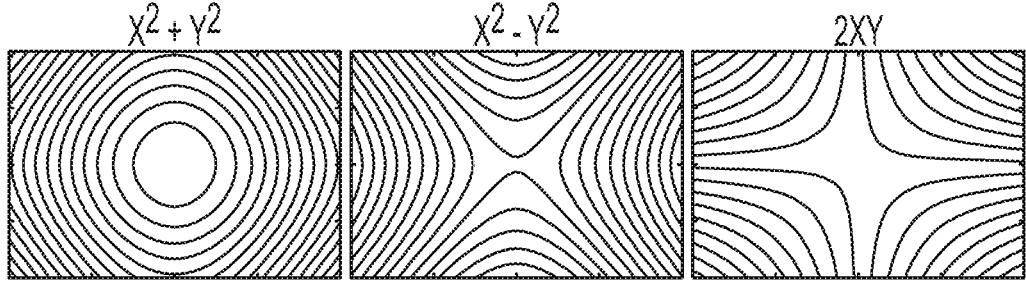
FIG. 8
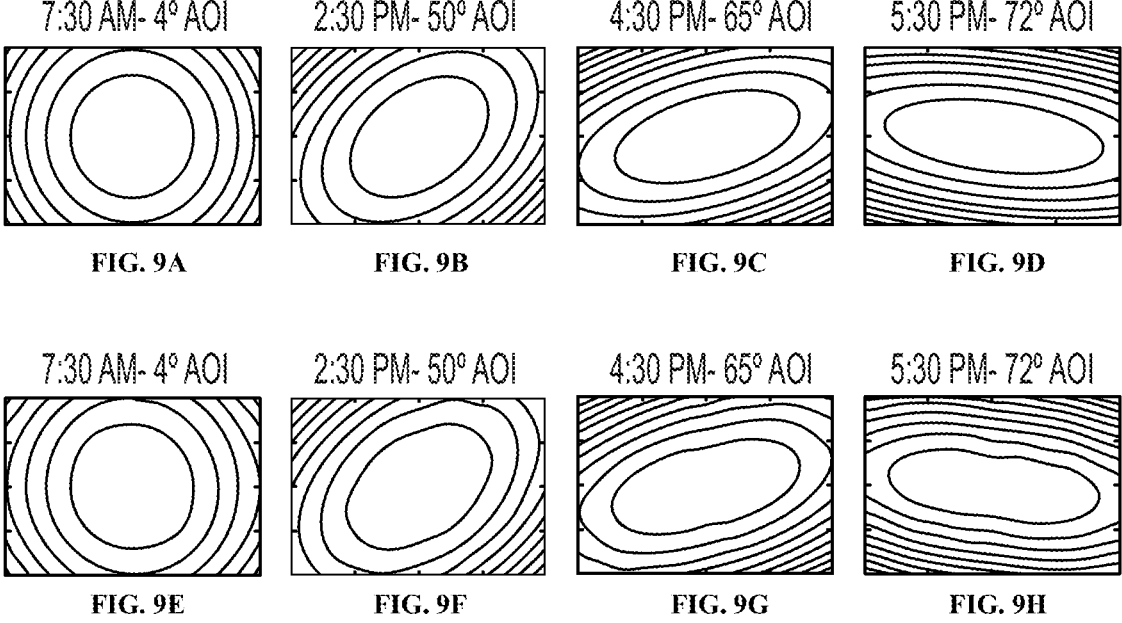
| 7:30 AM- 4° AOI | 2:30 PM- 50° AOI | 4:30 PM- 65° AOI | 5:30 PM- 72° AOI |
| :---: | :---: | :---: | :---: |
| FIG. 9A | FIG. 9B | FIG. 9C | FIG. 9D |
| 7:30 AM- 4° AOI | 2:30 PM- 50° AOI | 4:30 PM- 65° AOI | 5:30 PM- 72° AOI |
| FIG. 9E | FIG. 9F | FIG. 9G | FIG. 9H |

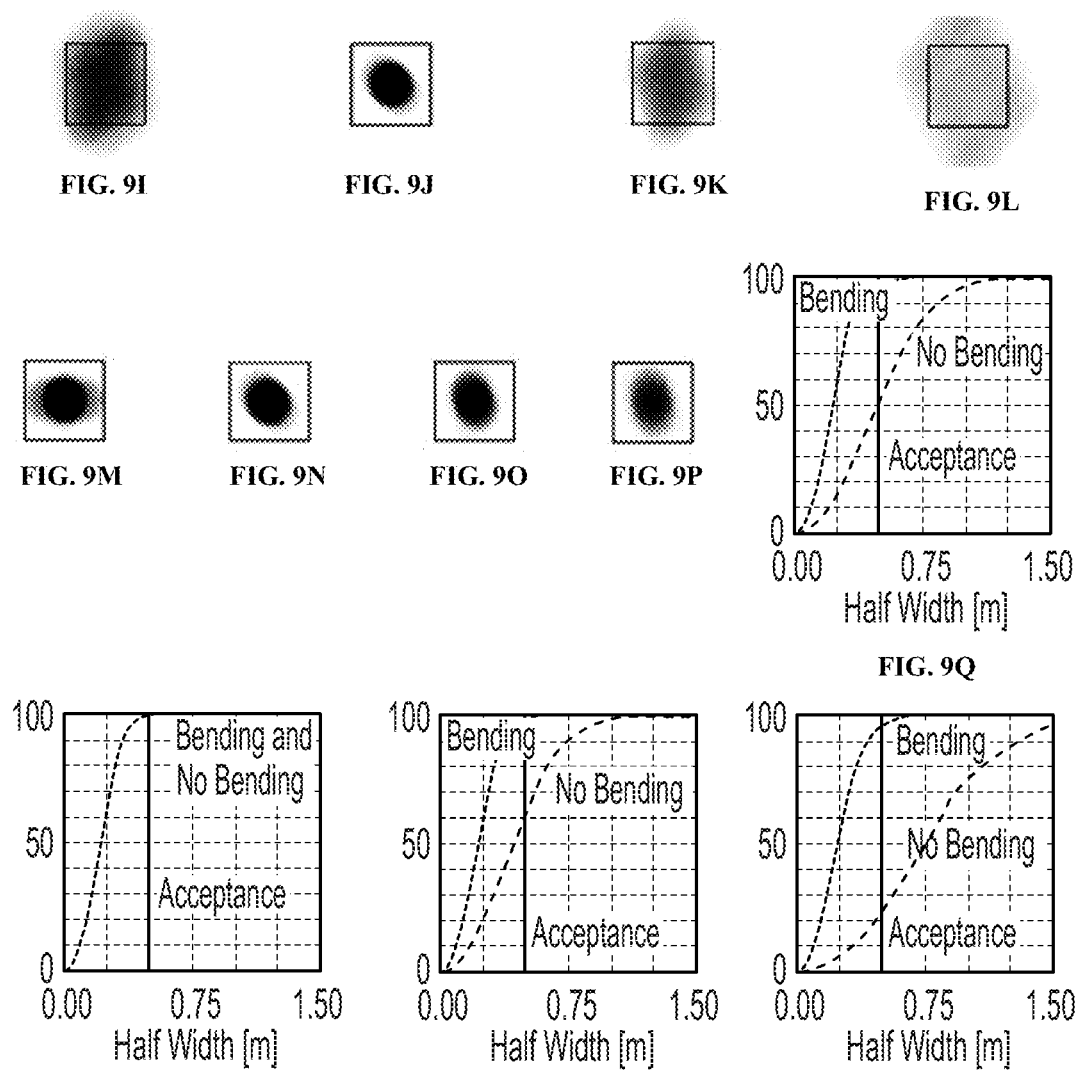
FIG. 9I     FIG. 9J     FIG. 9K     FIG. 9L
FIG. 9M     FIG. 9N     FIG. 9O     FIG. 9P
FIG. 9Q
FIG. 9R     FIG. 9S     FIG. 9T
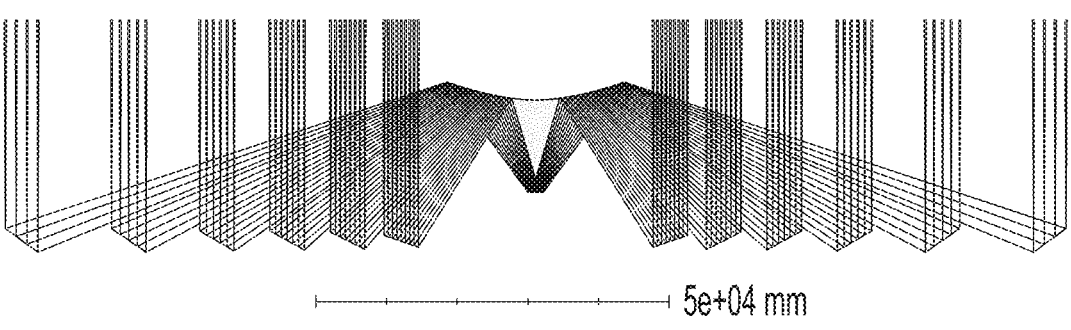
5e+04 mm
FIG. 10

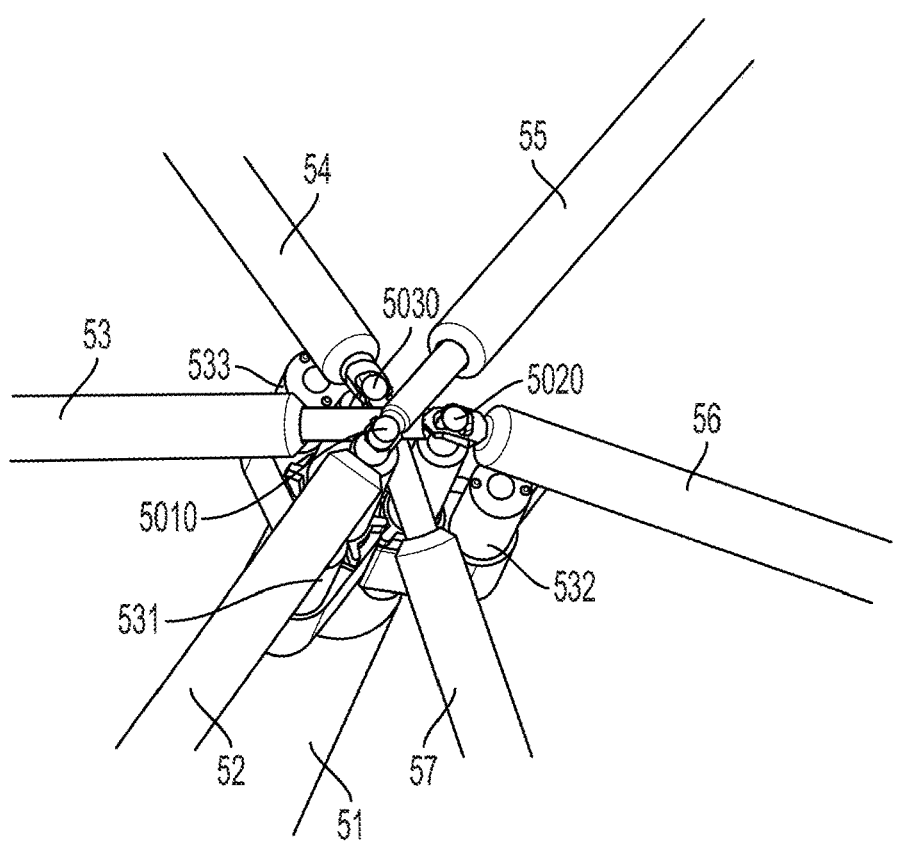
FIG. 13
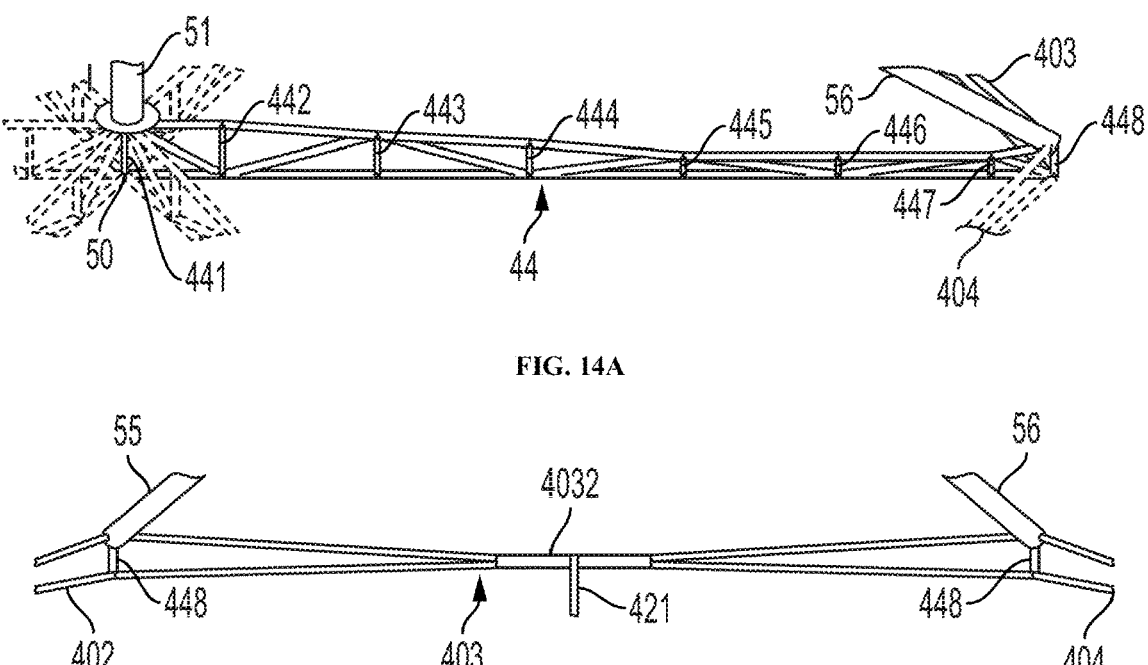
FIG. 14A
FIG. 14B

Modelled Shape for $X^2 + Y^2$

Modelled Shape for 2XY

Modelled Shape for $X^2 - Y^2$

7:30 AM - 4° AOI     2:30 PM - 50° AOI     4:30 PM - 65° AOI     5:30 PM - 72° AOI
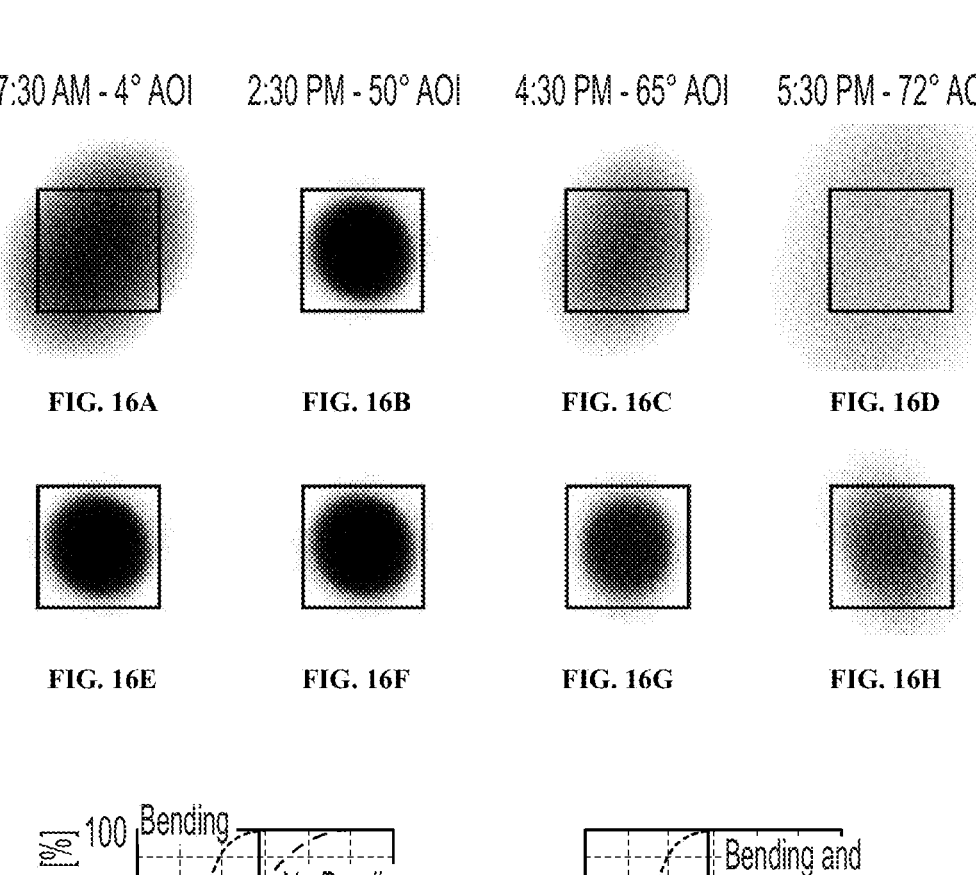
FIG. 16A     FIG. 16B     FIG. 16C     FIG. 16D
FIG. 16E     FIG. 16F     FIG. 16G     FIG. 16H
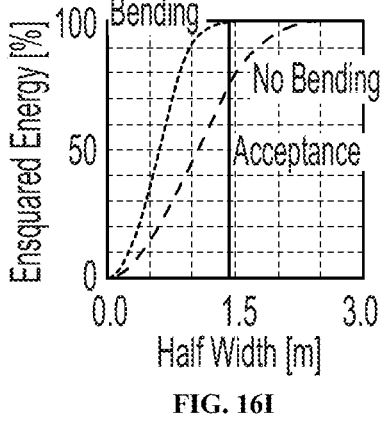
FIG. 16I
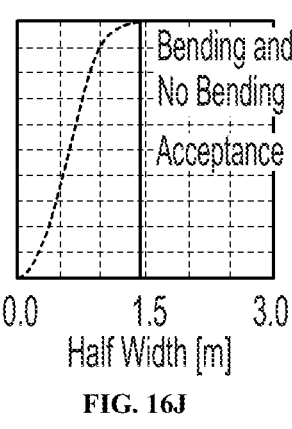
FIG. 16J
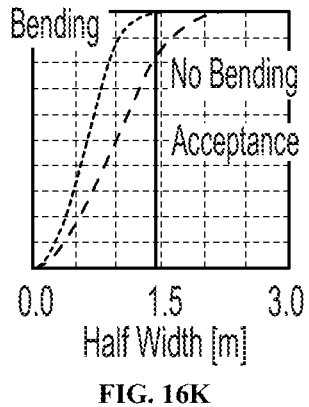
FIG. 16K
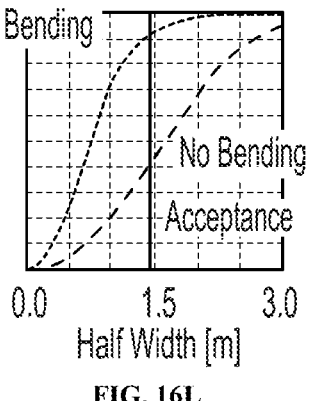
FIG. 16L

ACTIVELY FOCUSED LIGHTWEIGHT HELIOSTAT

CROSS-REFERENCE TO RELATED APPLICATIONS

This application is a U.S. National Stage Application of PCT/US2020/053130, filed Sep. 28, 2020, which claims priority benefit to U.S. Provisional Patent Application No. 62/906,436, filed on Sep. 26, 2019, the entire content of which is incorporated herein by reference. All references cited anywhere in this specification, including the Background and Detailed Description sections, are incorporated by reference as if each had been individually incorporated.

BACKGROUND

1. Technical Field

The field of currently claimed embodiments of this invention relates to heliostats, and more particularly to heliostats with active adjustment of surface shape to better concentrate reflected sunlight onto a fixed target.

2. Discussion of Related Art

A heliostat is a device generally in a fixed location, with a mirrored surface to reflect solar energy toward a fixed target. Heliostats typically have one or more back-silvered glass mirrors attached to a rigid steel frame. Arrays of heliostats are commonly used to concentrate sunlight to harvest solar power. A heliostat includes a tracking mechanism which turns the reflecting surface to maintain the reflected image on the target as the sun moves through the sky. Most commonly the mount is of the alt-azimuth type, with the mirror structure turned about a horizontal elevation axis set above a vertical azimuth axis (US20150015975A1 Shmuel Huss).

The highest concentration of sunlight that can be formed by a heliostat on a distant target is set by the angular diameter of the solar disc, equal to $\frac{1}{2}°$ or $\frac{1}{115}$ radians. Typically, in very large heliostat installations used for solar thermal generation of electric power (CSP), the receiver is sized to subtend an angle of $\frac{3}{4}$ to 1 degree, and the heliostats, which are essentially flat, are sized to be smaller than the solar disc image at the receiver to avoid blurring. Heliostats with size approximately $\frac{1}{3}$ the solar disc size are used in the largest CSP installations. A disadvantage of using such small, flat heliostats is that to obtain high sunlight concentration, a very large number must be used, for example some 50,000 heliostats are needed around a tower-mounted cylindrical receiver to obtain a ratio of receiver to mirror area ~800 in the best cases. The resulting concentration at the target allowing for cosine and other losses is around 500×. Higher concentrations are desirable to achieve higher temperatures, for both more efficient CSP generation and for solar industrial process heat (SIPH)

The very large numbers of heliostats needed to achieve high concentration may be reduced to some degree by using larger heliostats with concave reflector surfaces, in order that the light reflected by a larger surface is focused to some degree on the receiver target. But the shape needed for the highest concentration (by forming an image of the sun) depends on the angle at which sunlight strikes the reflector, and this changes as the position of the sun in the sky changes throughout the day. If the shape is fixed, then the optimum curved shape for a given heliostat position in the field is that which minimizes the image blurring or spillage over a year of operation. In general, this shape will be a toroid, that is a surface with concave curvature that varies according to angle around the mirror, and will be chosen so that the imaging quality is best around the middle of the day. U.S. Pat. No. 4,459,972 to Moore discloses such a concave focusing reflector which is formed as a section of a toroid.

To minimize the image degradation at other times of day, the mount for a heliostat with fixed toroidal curvature may be constructed with a first rotation axis along the line to the target, as shown in FIG. 1. (from K. Chong, "*Optical analysis for simplified astigmatic correction of non-imaging focusing heliostat*," Sol. Energy 84 (8), 1356-1365 (2010). The error is limited to the amount of the curvature in the two toroid axes, because with this dual axis mount geometry the angular orientation of the toroid remains fixed.

Heliostats built for such a target-axis mount with also the capability to change the two toroidal radii of curvature, and thus to obtain ideal solar disc imaging throughout the day, have been described in two inventions. In US 2015 0323772A1 Mixed Heliostat Field L. Gallar describes a reflecting surface assembled from many small reflecting segments which are oriented by a system of cams and two drive motors. A different, passive approach to changing the toroid curvature of a heliostat on a target axis mount is described by Lehmann and Allenspach in PCT/AU2012/ 000382, Toroidal heliostat, where the support of the reflecting surface is configured to bend by passive means in order to change the tangential and sagittal toroidal curvatures.

In practice, neither of the above inventions have been adopted for commercial use, because of complexity and cost. Their requirement for a target-axis mount necessitates the addition of a third axis, needed to set the angle of the target axis bearing, which is different for each heliostat according to field position. Secondly, both the type of mount and the curvature adjustment mechanisms reduce stiffness, a critical difficulty for commercial heliostats which must withstand wind gusts of up to 90 mph.

In view of these challenges and difficulties, the long-felt needs to obtain better collection efficiency at lower cost and to simplify and reduce the cost of improving sunlight concentration without compromising heliostat stiffness, all continue to leave room for improvement over the prior art.

SUMMARY

A heliostat according to an embodiment of the current invention includes a reflecting surface; an elastically deformable frame on which the reflecting surface is mounted, a truss structure behind the elastically deformable frame that includes at least four bracing struts with first ends attached to the elastically deformable frame and second ends attached to at least one node located centrally behind the frame; at least one actuator connected to at least one of the at least four struts at the at least one node; an electronic control system configured to communicate with the least one actuator; and a dual-axis mount to support and orient the above assembly. The actuation of the at least one actuator in response to the electronic control system causes compression or tension of at least one of the at least four bracing struts to thereby control a shape of the reflecting surface and the elastically deformable frame in at least low order bending modes.

A system according to an embodiment of the current invention includes a molding surface structured as a plurality of elements in a two-dimensional array, each said surface element being adjustable by three position actuators to set tip, tilt and piston to adjust a shape of the molding surface. A mating surface of each said element is pierced with holes, and the shape of the molding surface is configurable with an adjusted curved shape and one or a plurality of initially flat glass reflector panels may be pressed into contact with the surface and be held down in shape by suction through the holes.

A method according to an embodiment of the current invention includes adjusting a two-dimensional array of discrete mold surface elements of a mold to conform to a given mold shape, placing one or more flat glass reflector panels over the mold, pressing at least one of the one or more flat glass reflector panels to conform to the mold shape, holding the panels in shape by suction, placing over the panels a support frame with matching bonding pads prepared with adhesive, and curing the adhesive and removing the bonded assembly.

BRIEF DESCRIPTION OF THE DRAWINGS

The present disclosure, as well as the methods of operation and functions of the related elements of structure and the combination of parts and economics of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention.

FIG. 3B, changes in spherical curvature and astigmatism);

FIG. 8 shows contours of the calculated change in reflector surface shape, for displacements according to the given bending modes according to an embodiment of the present invention;

FIGS. 9A, 9B, 9C and 9D show different ideal toroidal reflector shapes at representative times early and late in the day according to an embodiment of the present invention;

FIGS. 9E, 9F, 9G and 9H show the surface contours of the heliostat of FIG. 6 computed by finite element modelling, including the effect of support frame bending, according to an embodiment of the present invention;

FIGS. 9I, 9J, 9K and 9L show the image of sunlight at the receiver at the representative times shown if the shape were fixed at that shown in FIG. 9F FIGS. 9M, 9N, 9O and 9P show the image of sunlight at the receiver at the representative times with the shape actively changed to those shown in FIGS. 9E, 9F, 9G and 9H;

FIGS. 9Q, 9R, 9S and 9T show the fraction of the total reflected sunlight that falls within squares of different size, with that in the marked 0.98 m squares flagged, according to an embodiment of the present invention;

FIG. 10 shows heliostats used in beam down solar collector array according to an embodiment of the present invention;

FIG. 13 shows detail of the linear actuators and second ends of the bracing struts according to an embodiment of the present invention;

FIGS. 14A and 14B show radial and tangential truss beams, respectively, of variable thickness according to an embodiment of the present invention;

FIGS. 16A, 16B, 16C and 16D show the image of sunlight at the receiver at the representative times shown if the shape were fixed the toroidal shape matched to good imaging at 2:30 pm according to an embodiment of the present invention;

FIGS. 16E, 16F, 16G and 16H show the image of sunlight at the receiver at the representative times with the shape actively changed by a superposition of the modeled bending shapes of FIG. 15;

FIGS. 16I, 16J, 16K and 16L show the fraction of the total reflected sunlight that falls within squares of different size, with that in the marked 2.87 m squares flagged according to an embodiment of the present invention;

DETAILED DESCRIPTION

Figure 1:
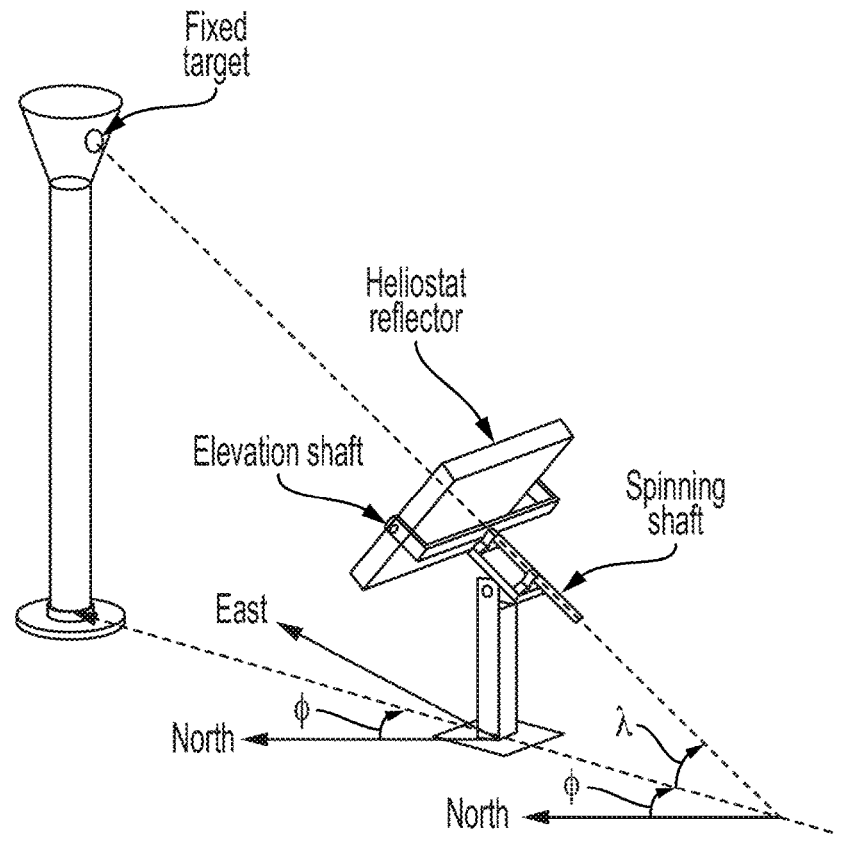
FIG. 1 is a schematic illustration of a dual axis mount with target-oriented first axis perspective view to help explain some concepts of the present invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

Accordingly, an embodiment of the current invention is a heliostat to actively focus highly concentrated sunlight to a fixed receiver. In the current state of the art, high concentration of sunlight requires use of many thousands of heliostats all directing light to the same distant receiving surface, with the large numbers leading to mechanical and operational complexity. Some improvement has been achieved in the past by use of heliostats configured with concave reflecting surfaces. However, a heliostat with any fixed surface shape can work well for only a limited fraction of the day, because the solar angle of reflection varies throughout the day as the sun moves through the sky. Active changes in shape are needed if good focus is to be obtained at all times. An embodiment of this invention is a heliostat whose surface shape is actively adjusted throughout the day to take on the different curvatures and orientation of toroidal shape needed to maintain sharp focus. The reflector supporting structure is configured with bracing struts behind it, which both stiffen the structure and allow for shape control, by incorporation of remotely controlled linear actuators into some of the struts. These enable active changes in the lowest order bending modes. In this way very high solar concentration may be maintained by a relatively small number of heliostats in the collecting field. The efficiency of energy collection is improved because of reduced spillage, and the very high concentration allows for exceptionally high receiver temperatures. Active control allows also for lighter weight and less expensive construction of the reflector support structure, because deformation by externally applied forces of gravity and wind may be countered by active control.

In some embodiments of the invention, actuation of the stiffening back struts is accomplished by three or four closely packed linear actuators, all acting in the direction of the central strut axis, with each actuator connecting to the second ends of a pair of back struts whose first ends act on opposite points on the perimeter of the reflector support frame. By extending or retracting these linear actuators, the reflector shape may be changed independently in any or all of the three orthogonal modes of focus change and astigmatism (two modes). By correct choice of the mode amplitudes, the changes in toroidal shape needed for good focus of the solar disc on a distant receiving surface may be obtained throughout the day, for any type of dual axis mount, including alt-azimuth. In one embodiment, the reflector support frame is engineered by tailored stiffness of its major truss members specifically to deform under actuation with good accuracy into any required combination of these three modes. In another embodiment, advantage is taken of the overall high stiffness of the braced mirror support structure to use a track-mounted spaceframe structure to complete a stiff alt-azimuth mount of low weight.

Controlled Changes in Shape of the Reflecting Surface

The heliostat according to an embodiment of the present invention is made to maximize concentration and minimize spillage of the sunlight directed to a fixed receiving target. For a heliostat at any given position in the field, this requires that the reflector shape changes through the day, so as to yield a focused image of the sun's disc on the receiver. The ideal shape for the reflecting surface is a concave toroid, with specific orientation and curvatures to be altered depending on the relative orientation of the sun, the heliostat and the receiver.

The ideal radii of curvature in the tangential plane, $R_T$, and perpendicular sagittal plane $R_S$ are derived using the Coddington equations:

$$R_T = R/\cos(\text{AOI})$$

$$R_S = R \cos(\text{AOI}) \qquad \text{Eq. 1}$$

where AOI is the angle of incidence of sunlight, and the radius of curvature, R, is chosen to be twice the magnitude of the tower vector (the vector from the vertex of the mirror to the receiver). The toroidal surface must be oriented so that the plane of reflection containing the incident and reflected rays is in the direction of the greater radius, $R_T$.

For a heliostat turned on an alt-azimuth mount, or any dual axis mount other than the target-axis type, the changes in shape require changes in both the tangential and sagittal curvatures of the toroid, and in the angular orientation of the toroid. Under these circumstances, it is advantageous to express the optical requirements for all the shape changes needed to maintain sharp focus in terms of the orthogonal, lowest order bending modes of the reflecting structure, and to construct an active bending system with the capability to induce these modes.

Any toroidal surface can be expressed as a sum of three orthogonal functions which are referenced to coordinates x,y, with the x coordinate parallel to the ground. For a reflecting surface on an alt-az mount, the x and y coordinates remain fixed with the reflecting surface.

If the solar vector is projected onto the local x-y plane of the mirror, as illustrated, then the required angle of astigmatism can be calculated. In equation 2, curvature C=1/R. (See FIG. 1)

$$a_1 = \frac{1}{4}(C_t + C_s) \qquad \text{Eq. 2}$$

$$a_2 = \frac{1}{4}(C_t - C_s)\sin(2\gamma_A)$$

$$a_3 = \frac{1}{4}(C_t - C_s)\cos(2\gamma_A)$$

$$Z = a_1(x^2+y^2) + a_2(2xy) + a_3(x^2-y^2) \qquad \text{Eq. 3}$$

Figure 2:
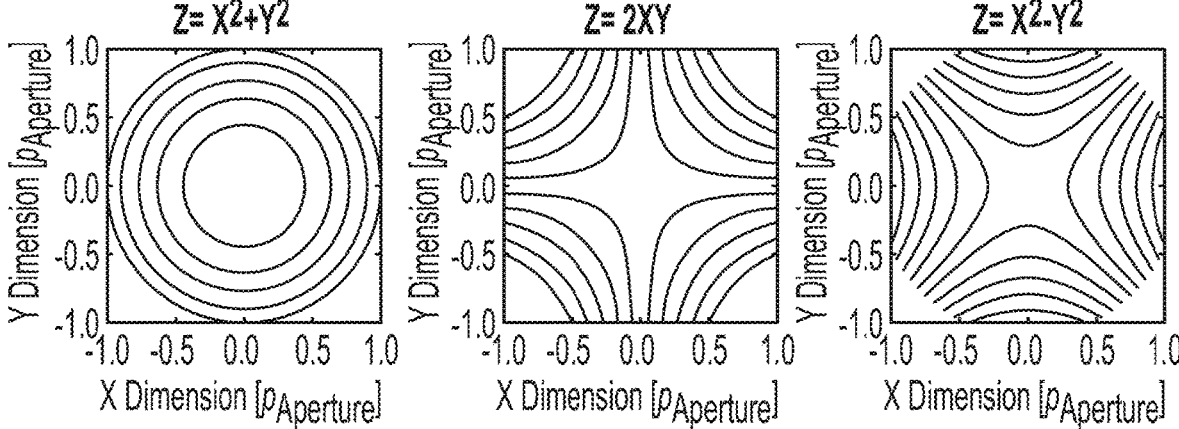
FIG. 2 shows contour maps of focus and the two orthogonal astigmatism functions.

FIG. 2 shows contour maps of the three orthogonal functions of focus change and the two orthogonal astigmatism functions.

Figures 3A, 3B:
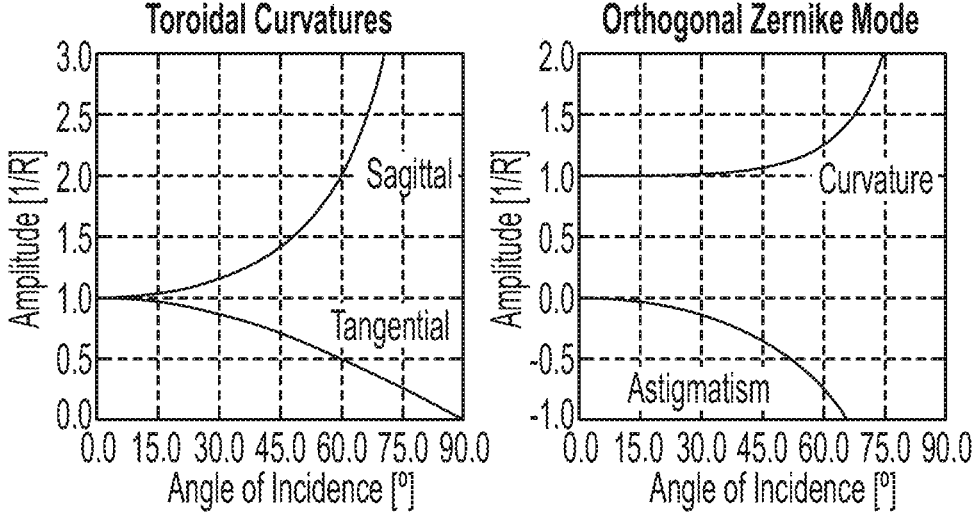
FIGS. 3A and 3B are plots of shape changes needed to image the sun at different angles of incidence (FIG. 3A Changes toroidal curvature.

FIGS. 3A and 3B illustrate the changes in shape needed if a toroid built to focus the sun incident at an angle 50° off normal is then to image the sun also at other angles of incidence. FIG. 3A gives the changes needed in toroidal curvature, assuming correct orientation, FIG. 3B gives them in terms of changes in the orthogonal modes of curvature and astigmatism, for any orientation.

The heliostats of this invention are designed to have their low order bending modes that approximate three orthogonal functions $(x^2-y^2)$, 2xy and $(x^2+y^2)$, and are equipped with actively controlled bending actuators which are used to deform the reflector surface shape according to these modes. In a method according to an embodiment of this invention, the optimum displacement settings $k_{nm}$ for the nth actuator needed to obtain a displacement of unit amplitude in the $m^{th}$ mode are determined using optical metrology of changes in the reflector shape z(x,y).

From Hook's law we know that the elastic deformation produced by any actuator is linearly proportional to the actuator displacement, thus to obtain the specific change in shape given by equation 3, the actuator settings $s_n$ will be given by linear summation, thus $$\begin{pmatrix} s_1 \\ s_2 \\ s_3 \\ s_4 \end{pmatrix} = \begin{pmatrix} k_{11} & k_{12} & k_{13} \\ k_{21} & k_{22} & k_{23} \\ k_{31} & k_{32} & k_{33} \\ k_{41} & k_{42} & k_{43} \end{pmatrix} \begin{pmatrix} a_1 \\ a_2 \\ a_3 \end{pmatrix} \qquad \text{Eqn. 4}$$

Figure 4:
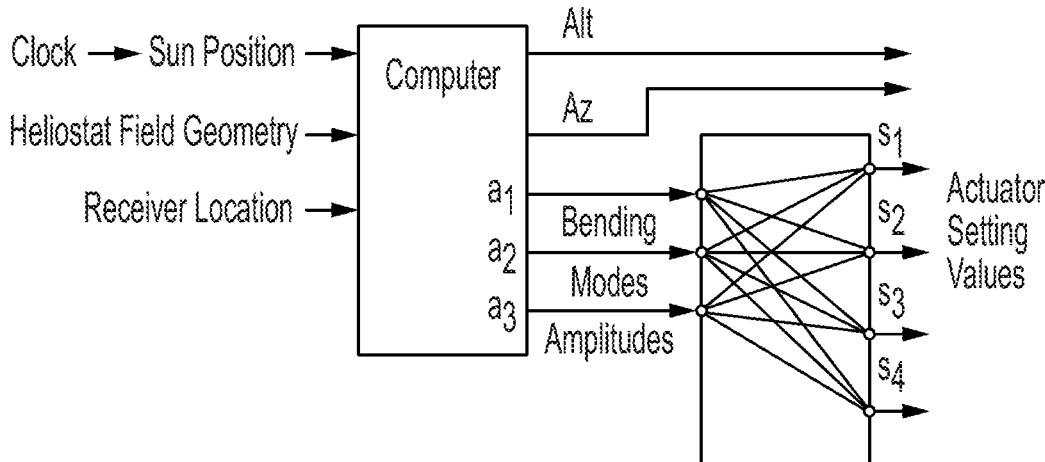
FIG. 4 is a schematic illustration of a heliostat control system according to an embodiment of the present invention.

FIG. 4 shows an electronic control system according to an embodiment of the present invention that can be used for each heliostat. Given the time of day and the date, a control program calculates the sun's position and, using the known field and receiver geometry, the settings required for the dual axis mount for the heliostat to reflect sunlight to the fixed receiver. It also calculates from the reflection the angle of incidence (AOI) and the angle of astigmatism γ, uses equations 2 and 3 to calculate the amplitudes of the three orthogonal bending modes a1, a2 and a3 needed to adjust the reflecting surface to the correct toroidal shape, and uses equation 4 to calculate the required actuator setting $s_n$.

In a method of operation according to an embodiment of the present invention, the heliostat shape with minimal bending actuation is set to be the annually-averaged shape for its given field location relative to the target. Then for the full range of different toroidal shapes needed throughout the day, the amplitude of the forces exerted by the actuators, which place elements of the structure in tension and compression, is minimized.

Embodiment 1

Figure 5:
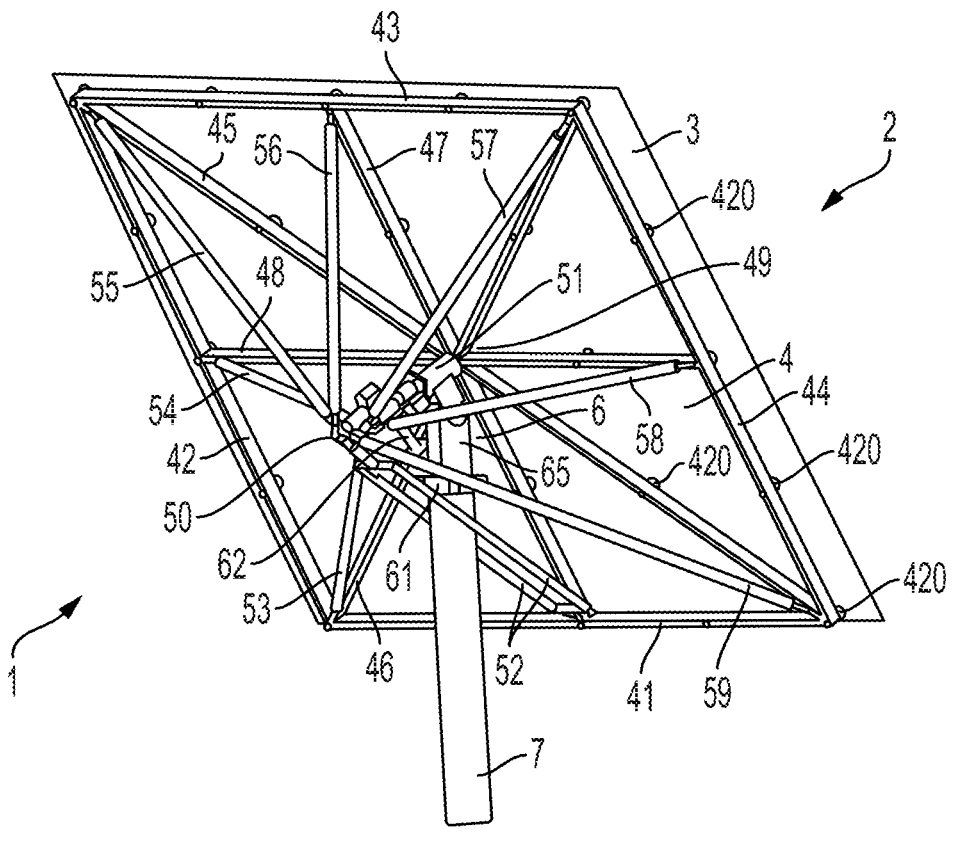
FIG. 5 is a schematic illustration of a heliostat with rectangular reflector assembly according to an embodiment of the present invention.
Figure 6:
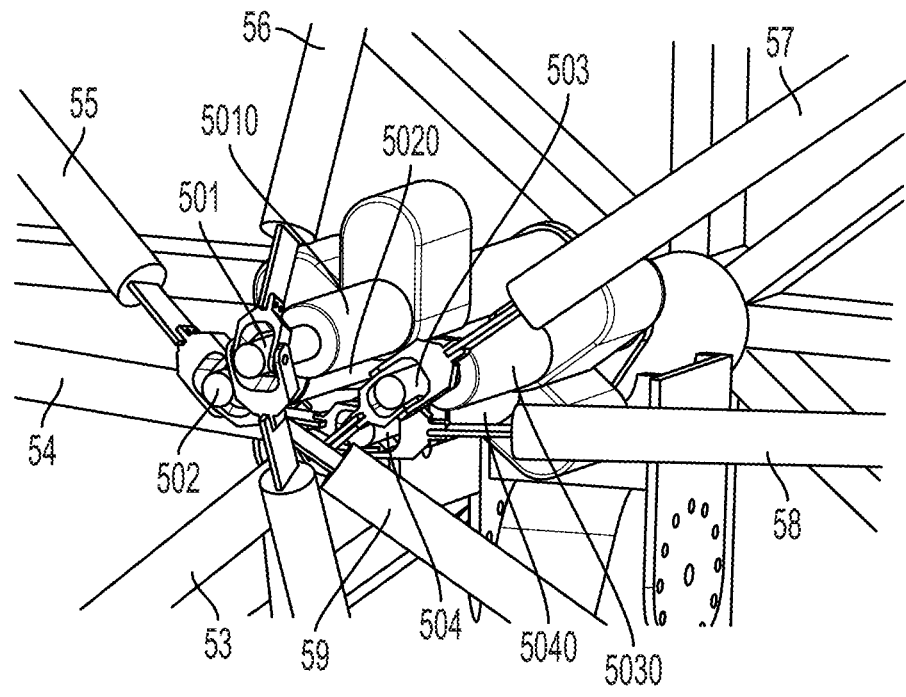
FIG. 6 shows detail of actuators and bracing struts according to an embodiment of the present invention.

FIG. 5 and FIG. 6 show an embodiment of the current invention in which the heliostat 1 uses a rectangular reflector assembly 2 of adjustable shape comprising a reflecting surface 3 attached by a plurality of pads 420 to an elastically deformable frame 4 whose shape can be actively controlled by back struts 51-59. The reflector assembly 2 is oriented by a dual-axis mount 6 supported by a post 7. In this embodiment the elastically deformable frame 4 comprises a planar array of straight beams 41-48 configured in "union jack," flag of the UK, form with beams 41, 42, 43, and 44 forming a rectangular perimeter, and diagonal beams 45 and 46 and vertical and horizontal beams 47 and 48 crossing at the frame center 49. The reflecting surface 3 is attached to the beams 41-48 of the frame 4 by a plurality of pads 420 or strips, with intervening standoffs configured such that the reflecting surface when the deformable frame 4 is in an unstressed state may have a specific concave or toroidal curvature. Behind the frame 4 is a stiffening and bending structure 5 that comprises nine rigid struts 51-59 with first ends attached to the frame 4 and second ends attached to a central back node 50.

The dual axis mount 6 comprises a slewing bearing 61 to turn the reflector assembly 2 in azimuth, and a linear actuator 62 to turn the assembly in elevation. The actuator 62 is connected at its lower end to a vertical column 65 above the azimuth bearing, and acts on the central back strut 51 to move the reflector assembly 2 in elevation.

FIG. 6 shows in detail how the shape of the reflective surface 3 may be actively controlled by the four linear actuators 5010-5040. In detail, the central back node 50 is divided into four adjacent nodes 501-504, whose distance perpendicular to the frame 4 may be altered by changing the lengths of the actuators 5010-5040. Thus when the linear actuator 5010 is extended, node 501 connected to the second ends of struts 52 and 56 moves out, pulling up also the first ends of the struts 52 and 56, bending back the vertical beam 47 and the locally connected reflective surface 3 so that the region above the frame beam 47 becomes less concave. Conversely, when the linear actuator 5010 is retracted, the two struts 52 and 56 are placed in compression, their first ends pushing away the ends of the vertical beam 47 and making the region of the connected reflective surface 3 above the frame beam 47 more concave.

Linear actuator 5020 acts similarly on struts 59 and 55 to raise of depress regions of the surface 3 local to these struts (beam 45). Linear actuator 5030 acts on struts 53 and 57 to raise or depress the reflector surface local to beam 46, and linear actuator 5040 acts on struts 54 and 58 to raise or depress the reflector surface local to beam 48.

Changes in the shape through the day of the reflecting surface 3 and its supporting frame 4 are made by driving the four linear actuators 5010, 5020, 5030 and 5040 independently under active servo loop control from absolute position sensors.

Embodiment 1 Made with a One-Piece Rectangular Glass Reflector

In one version of the first embodiment, the reflecting surface is implemented as a single rectangular sheet of back-silvered float glass, supported by a plurality of pads held by the frame. When the initially flat float glass reflector is attached to the unstressed supporting frame 4, it is bent so as to take on the desired shape, for example, the annually-averaged shape for the heliostat in a given field location relative to the target, chosen to minimize the total amount of active bending required early and late in the day.

Method of Manufacture for Attaching Mirror Segments to a Supporting Frame

In prior art (WO 2012/083374, PCT AU2011/001667 2012 Heliostat construction Burton, A.), a glass reflector is bent into the desired concave shape for attachment of a frame by means of a mold machined to have the convex, inverse shape, the glass being pressed to conform to this shape while adhesive between the glass and the frame is cured to hold the glass in shape. This method is not ideal because of springback: the assembly may not retain the mold shape once it is cured and removed. Also, the process is expensive if many differently shaped machined mold-shapes are required, as is the case especially for a field of heliostats surrounding a central tower.

In US 2017/0369355 A1, Glass or Metal Forming Mold of Adjustable Shape Angel and Stalcup describe a method for thermoforming deeply curved solar reflectors using an adjustable mold. The mold has a continuous surface made up from many touching hexagonal segments whose tip, tilt and piston may be individually adjusted under computer control, so that reflectors of many different shapes may be made by slumping hot glass onto the same mold, adjusted to have different shapes. This method is not ideal for our purpose, because glass replicas do not suffer from springback, and because of the high cost of making a continuous deformable surface for operation at high temperature.

Figure 20:
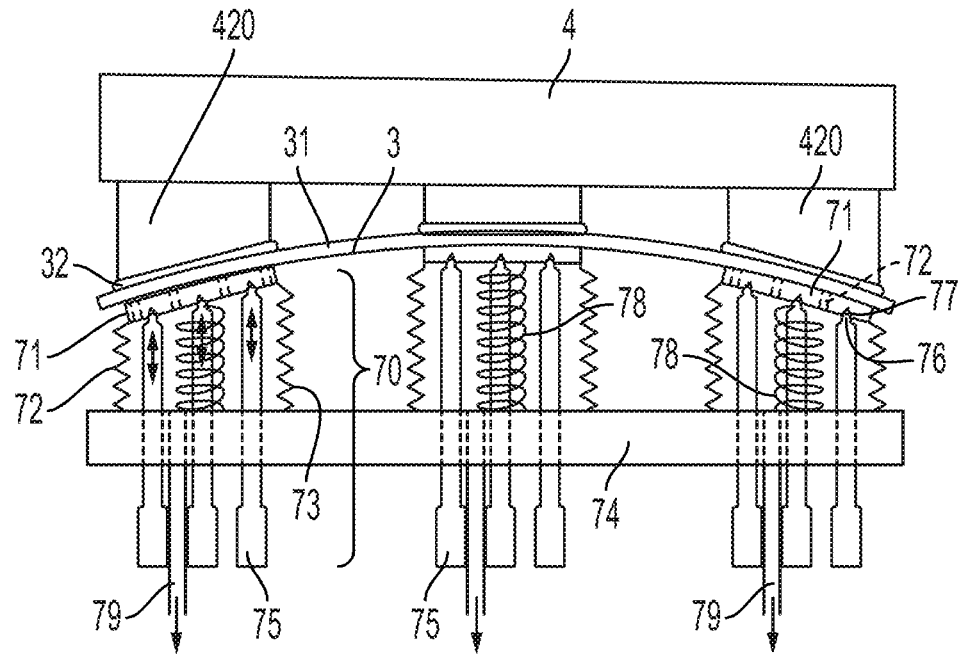
FIG. 20 is a schematic illustration of a system and method of manufacture according to an embodiment of this invention.

FIG. 20 shows a schematic of a method of manufacture according to an embodiment of this invention that can overcome these deficiencies. A convex mold for shaping glass by elastic bending comprises a plurality of discrete mold supports 70 whose height and tilt may be adjusted under computer control. Each mold support 70 comprises a face pad 71 held in position by a triangular configuration of three adjustable screw actuators 75 set in in the mold frame 74. The tips of the screw actuators 75 are spherically curved and engage in grooves 77 in the back face of the face pads 71. A spring 78 holds each face pad in contact with the screw actuators, the assembly forming a kinematic mount. The face pads 71 are hermetically sealed to the mold frame 74 by a bellows 73. The mold supports 70 are initially set to conform to the inverse (convex) form of any one of the desired shapes of the reflecting surface, which differ according to field location. An unstressed mirror support frame 4, fitted with pads or supports 420 of variable thickness, with height and tilt as needed to conform to the desired reflector shape, is positioned to register with the discrete supports of the adjustable mold. One or a plurality of glass mirrors 31, initially flat, are then placed on the mold, pressed down into contact with the discrete supports 70 and suction applied through holes 72 in each support face 71 to hold down the glass mirrors in contact. Adhesive 32 is applied to the pads 420 of the reflector support frame 4, which is then placed in position over the glass and held in place while the adhesive sets. The reflector assembly 4 is then removed from the mold and the shape of the reflector surface 3 measured by metrology. Measured shape errors, which may arise from springback forces reacting from the bent glass back onto the frame or pad adhesive, are then compensated by adjustment of the heights and tilts of the discrete mold supports 70 according to the height and tilt error measured at each pad location, and a new replica made. This process is repeated until a replica is made in which the surface of the glass in the completed glued frame unit has the desired shape, including the correct tip and tilt as well as height at each pad location. Then the required number of replicas of that specific shape are made with no further adjustments. The same procedure is repeated to make the desired quantity of many different static reflector shapes required for the heliostat field, by adjustment of the same mold to different shapes.

In this way, the shape of the reflector/frame assembly may be realized with high accuracy, particularly because the reflector support pads 420 will be holding not only the height of the glass to conform to the desired shape, but also the bending moment applied to the glass by the mounting pad. Inward bending moments applied around the perimeter of the individual glass sheets, which will result from the iterative process of this invention, are key to the glass taking on an accurate concave shape clear to the edge.

Modeled Performance of a Dimensioned Example of this Embodiment

Performance of this embodiment is given here for a reflector frame 4 of specific dimensions, modeled by finite element and ray tracing analysis. The reflecting surface 3 is a single sheet of back-silvered glass, measuring 3.3 m×2.3 m×4 mm thick, for area 7.59 m$^2$ and weight 80 kg. This size is chosen because it respects the standard width of 3.3 m for float glass manufacture, and the standard 2.3 m height for shipment in a container. The steel union jack structure of the reflector frame 4 is a made from rectangular 1"×2" steel tube with ¹⁄₁₆" wall and weighs 50 lb. The glass reflector is supported by 25 pads 420, located as shown in FIG. 5, at the corner, middle and center points of the support frame.

Figures 7A, 7B, 7C:
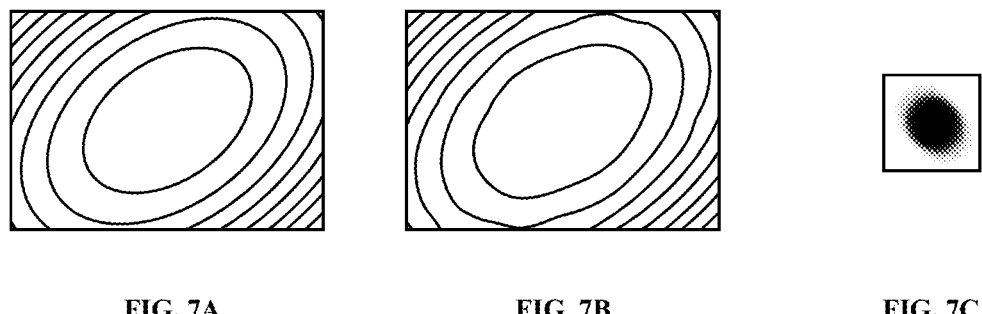
FIG. 7A shows surface contours of a desired first toroidal surface, at 3 mm intervals according to an embodiment of the present invention.
FIG. 7B shows surface contours of the glass reflector on 25 support pads, as modeled by ANSYS according to an embodiment of the present invention.
FIG. 7C shows a ray trace image of the sun formed by reflection from the modeled surface of FIG. 7B.

FIGS. 7A-7C show the result of finite element analysis modeling the surface shape of this specific reflector and frame set to a specific annual average toroidal shape for 80 m focal length, by setting the 25 discrete pads 420 to heights at their locations calculated for the prescribed toroid. FIG. 7A shows the contours of the desired toroidal surface, with the contour interval of 3 mm. The sagittal depth from the two highest corners to the center is 30 mm. FIG. 7B shows the surface contours of the shape as modeled by finite element analysis. FIG. 7C shows an image of the sun that the actual surface would form at a distance of 80 m, calculated by ray tracing for sunlight incident 46° from normal incidence. All three figures are drawn to the same scale. The square drawn around the solar image is 1 m on a side, approximately one-seventh of the area of the 2.3, ×3.3m reflector.

In use through the day, the support frame will be bent to take on different toroidal shapes by suitable adjustment of the four actuators 5010-5040. FIG. 8 shows contour maps of the desired changes of shape in the three different orthogonal modes with actuator stroke amplitudes optimized by ANSYS finite element analysis to best realize the desired orthogonal bending modes. The left-hand panel of FIG. 8 is for change in curvature mode, $x^2+y^2$, the center and fight-hand panels of FIG. 8 are for the astigmatism modes $x^2-y^2$ and 2xy respectively.

Reflector Shapes and Imaging Performance Obtainable Through the Day by Active Shape Adjustment The solar imaging performance obtainable through the day by active shape adjustment of the specific alt-azimuth mounted 2.3 m×3.3 m rectangular heliostat of this embodiment is given here. A representative target location, 75 m due east of the heliostat is chosen, the target is on a 26 m high tower, and the analysis is made for each hour of a representative day, chosen to be the equinox. The toroidal shape to be built-in to the reflector, with no bending forces applied by the struts 51-58, is taken to be that required for good imaging at 2:30 pm when the angle of incidence is 46°, as shown in FIG. 7A above.

Table 1 lists for each hour of the day the solar elevation, the angle of incidence of sunlight reflected by the heliostat, and the mirror elevation. The orientation of the reflecting surface varies from nearly normal incidence in the early morning, when the light is reflected back to the east, to 67° in the late afternoon when the sun is low in the west. Table 1 also lists the amplitude of the curvature and two astigmatism bending modes that must be applied to obtain the ideal toroidal heliostat shape to focus sunlight onto the target, as obtained from equation 3 above.

TABLE 1

| | | Mode amplitudes | | | | |
|---|---|---|---|---|---|---|
| Time | Solar Elevation | Angle of Incidence | Mirror Elevation | Crv | C5 | C6 |
| 7:30 AM | 17 | 4 | 18 | −0.13 | −0.48 | 0.22 |
| 8:30 AM | 29 | 9 | 24 | −0.13 | −0.47 | 0.22 |
| 9:30 AM | 41 | 16 | 31 | −0.13 | −0.44 | 0.22 |
| 10:30 AM | 51 | 23 | 37 | −0.13 | −0.39 | 0.22 |
| 11:30 AM | 58 | 31 | 43 | −0.12 | −0.32 | 0.22 |
| 12:30 PM | 60 | 38 | 50 | −0.10 | −0.24 | 0.20 |
| 1:30 PM | 56 | 45 | 56 | −0.07 | −0.12 | 0.14 |
| 2:30 PM | 47 | 53 | 62 | 0.00 | 0.00 | 0.00 |
| 3:30 PM | 36 | 60 | 68 | 0.12 | 0.08 | −0.29 |
| 4:30 PM | 24 | 67 | 74 | 0.36 | −0.13 | −0.83 |
| 5:30 PM | 12 | 74 | 81 | 0.87 | −1.86 | −0.81 |

FIGS. 9A-9T is a composite showing for representative times early and late in the day the desired and computed reflector surface contours. FIGS. 9A, 9B, 9C and 9D show the different ideal toroidal reflector shapes determined also from Equation 3 needed at representative times early and late in the day, 7:30 am, 2:30 μm, 4:30 pm and 5:30 pm, corresponding the solar elevations of 12°, 51°, 29° and 17°. The difference in the two toroidal curvatures increases through the day, and the axis of the toroid rotates. FIGS. 9E, 9F, 9G and 9H show the surface contours of the heliostat of FIG. 5, after adjustment of the actuators 5010-5040 as needed to bend the frame with the mode amplitudes listed in Table 1. It can be seen that both the amplitude of the toroidal curvatures and the orientation of the toroid axis are obtained with good fidelity.

FIGS. 9M, 9N, 9O and 9P and 9Q, 9R, 9S and 9T show for each hour the improvement in sunlight concentration at the receiver that results from the active adjustments reflector shape, calculated by ray tracing. FIGS. 9I, 9J, 9K and 9L show the sunlight at the receiver if the shape were fixed at the 2:30 shape shown in FIG. 7B, while FIGS. 9M, 9N, 9O and 9P show the sunlight at the receiver if the heliostat is actively changed to the shapes shown in FIGS. 9E, 9F, 9G and 9H. The reference squares drawn in FIGS. 9E, 9F, 9G and 9H and 9I, 9J, 9K and 9L are drawn with sides measuring √2 times the diameter of the solar disc imaged at 80 m focal length, namely 0.984 m. The improvement in concentration is quantified in FIGS. 9Q, 9R, 9S and 9T, which show the fraction of the total reflected sunlight that falls within squares of different size—the ensquared energy. For the 0.98 m squares as drawn in FIGS. 9I, 9J, 9K and 9L and 9M, 9N, 9O and 9P, the ensquared energy is above 95% for all the images shown, i.e. the spillage is less than 5%, while without active shape adjustment the spillage approaches or exceeds 50%, except for the 2:30 hour chosen to require no shape correction.

High concentration may be achieved on a tower-mounted cylindrical central receiver with a relatively small number of heliostats made according to this specific embodiment. Such a system would be suitable for collection of heat at very high temperature for industrial processes. For example, a field of 150 m diameter might be used as a solar collector with 776 heliostats of total mirror area 5,890 m², (a mirror to field area ratio of ⅓), and the cylindrical receiver made with a surface area of 3.04 m², equal to 2π times the square of the ideal solar disc diameter, as for efficient large CSP heliostat fields. But in this case the ratio of mirror to receiver area is 1,940, about twice that achieved in fields with much larger numbers of unfocused heliostats. Such high concentration will allow for heating of thermal transfer or storage fluids to 1000° C., as needed for many industrial processes. For a solar direct normal incidence input flux of 1 kW/m², the sunlight energy delivered to the focus, allowing for 30% reduction from cosine factor, blocking, and reflectivity, is 4 MW.

FIG. 10 shows the same field of 776 heliostats used in a beam-down configuration to relay the highly concentrated primary focus to a cavity receiver 81 with an upward facing entrance window.

A secondary hyperbolic mirror 82 of 25 m diameter and 22 m focal length is added to reflect the primary focus of the heliostat field down to a focus 83, 7 m above the level of the heliostat array. This configuration can be advantageous for high temperature operation, by avoiding the requirement for heat transfer through pipes at ~1000 C from a receiver on a high tower. For the geometry as shown, for a receiver aperture of diameter 1.5× the relayed solar disc diameter of 2 m, the mirror to receiver area ratio is 1,875×.

Embodiment 2 with Hexagonal Structure

Figure 11:
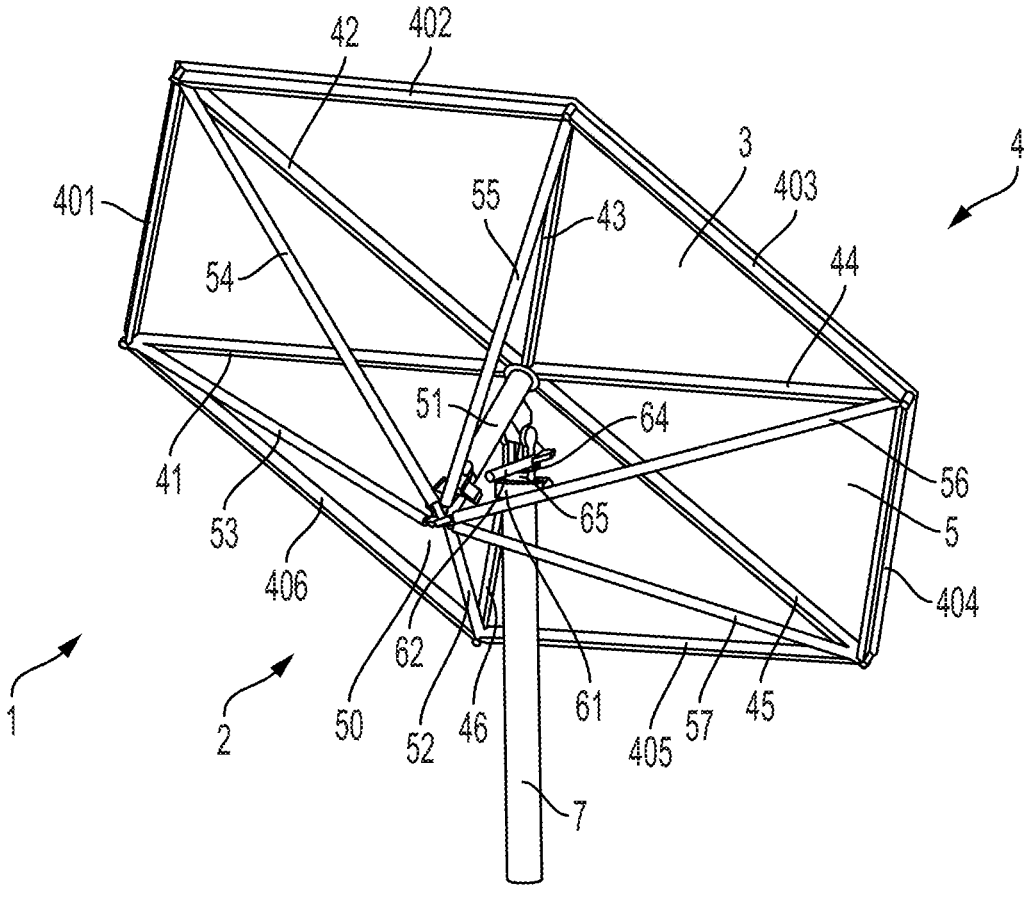
FIG. 11 is a schematic illustration of a hexagonal heliostat with 7 back struts according to an embodiment of the present invention.

FIG. 11 shows a schematic diagram of second embodiment of the invention 1 in which a hexagonal reflector assembly 2 of adjustable shape comprises a reflecting surface 3 attached to an elastically deformable frame 4 whose shape can be actively controlled by back struts 5. The reflector assembly 2 is oriented by a dual-axis mount 6 supported by a post 7.

In one embodiment the dual axis mount 6 comprises a slewing bearing 61 to turn the reflector assembly 2 in azimuth, and a linear actuator 62 to turn the assembly in elevation. The actuator 62 is connected at its lower end by a trunnion 64 to a vertical column 65 above the azimuth bearing, and acts on the central back strut 51 to move the reflector assembly 2 in elevation.

In this embodiment the elastically deformable frame 4 comprises a planar array of six radial beams 41-46 and six beams 401-406 forming a hexagonal perimeter. The reflecting surface 3 is attached to all twelve beams of the frame 4 by a plurality of pads 420 or strips, with intervening stand-offs configured such that the reflecting surface when the deformable frame 4 is not being bent by the back struts 5 may have a specific concave or toroidal curvature. Behind the frame 4 the stiffening and bending structure 5 comprises seven rigid struts 51-57 with first ends attached to the corners of the hexagonal perimeter of frame 4 and second ends are attached to a central back node 50.

Finite element analysis of the bending of the deformable frame 4 made with simple primary radial struts 41-46 and perimeter struts 401-406 of uniform cross section and stiffness shows that the three desired bending modes of spherical curvature and the two astigmatisms are realized only approximately. The radial curvature tends to be more conical rather than circular, while the perimeter tends to sharper curvature at the corners than in the middle of the sides.

Figure 12:
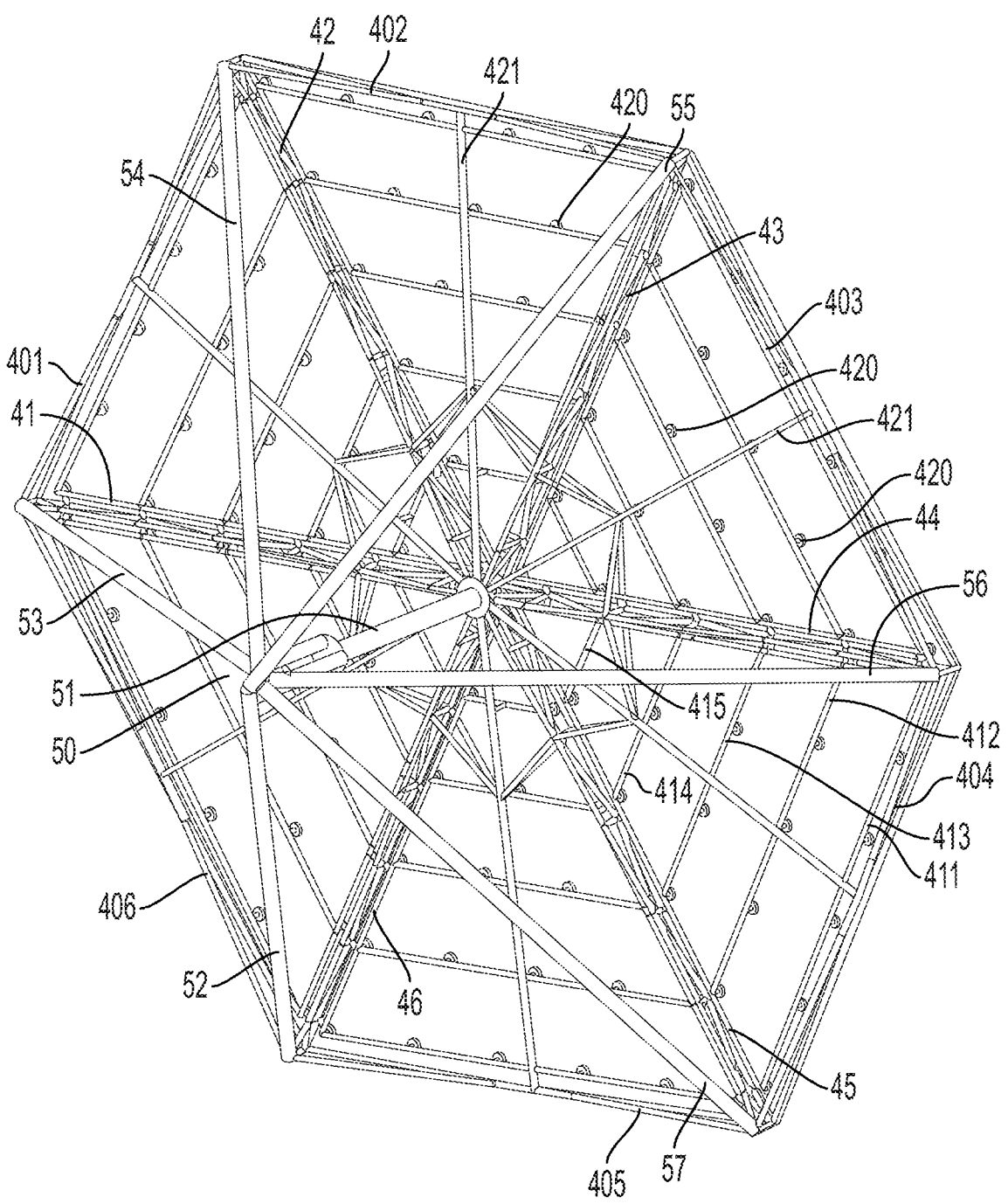
FIG. 12 is a schematic illustration of a specific hexagonal reflector assembly according to an embodiment of the present invention.

A 48 m² Hexagonal Embodiment Optimized Using Finite Element and Ray Tracing Analysis FIG. 12 shows a reflector assembly of specific preferred design, optimized by finite element analysis to deform by actuation of the six bracing struts 52-57 into the specific desired orthogonal modes. A design of specific dimensions has been optimized using an ANSYS finite element model. The reflecting surface is a regular hexagon, 6.26 m flat-to-flat and 7.3 m corner-to-corner. It is designed for use in a collector field of intermediate size, to take on the range of toroidal shapes needed to focus sunlight onto a receiver on a 75 m high tower at 220 m distance The 48 m² reflecting surface 3 is made of 4 mm thick mirrored glass, comprising multiple glass segments, one central hexagon measuring 2.5 m flat-to-flat, and six surrounding trapezoidal outer segments measuring 3.6 m by 2.5 m, sized so they can be cut from standard 3.3 m width float glass with little waste, and transported by shipping container.

The elastically deformable support frame 4 has six radial major member 41-46 and six perimeter major members 401-406, all 3.6 m long. These members are built as light-weight steel trusses as shown, across each 60° segment of the support frame 4 are 5 inner tangential beams 411, 412, 413, 414 and 415 and one intermediate radial beam 421. The reflecting surface 3 is attached via standoffs to all 30 inner tangential beams by a total of 120 support pads 420 as shown. The position and tilt of the pads 420 are configured such that the reflecting surface when the deformable frame 4 is not being bent by the back struts 5 has a specific concave toroidal curvature of average radius of 460 m. Behind the frame 4 the stiffening and bending structure 5 comprises seven rigid struts 51-57 with first ends attached to the corners of the hexagonal perimeter of frame 4 and second ends attached to a central back node 50.

Not shown in FIG. 12 is the dual axis mount. In one embodiment of this heliostat, this would be as in FIG. 11, with azimuth rotation provided by a slewing bearing and elevation rotation driven by a linear actuator. In another embodiment of this heliostat, dual axis motion is driven by only linear actuators. Such an alternative configuration to an alt-azimuth mount that limits the motion in both axes is convenient also for orienting a radially symmetric reflector structure is described by Balz et al. WO2015150445A2 WIPO (PCT) Markus BALZ Sbp Sonne Gmbh.

FIG. 13 shows a detailed view of the three linear actuators 5010-5030 used for active control of the support frame 4 and reflective surface 3. Changes in the shape through the day of the reflecting surface 3 and its supporting frame 4 are made by driving the three linear actuators independently via the gear motors 531, 532 and 533 under active control. Each actuator is equipped with a sensor read out to an electronic control system, as shown in the schematic of FIG. 6.

The central back node 50 is divided into three adjacent nodes 501-503, whose distance perpendicular to the frame 4 may be altered by changing the lengths of the actuators 5010-5030. Thus when the linear actuator 5010 is extended, the second ends of struts 52 and 55 move out, pulling up also the first ends of the struts 52 and 55, bending back the beams 42 and 45 and the locally connected reflective surface 3 so that the region adjacent to the truss beams 42 and 45 becomes less concave. Conversely, when the linear actuator 5010 is retracted, the two struts 52 and 55 are placed in compression, their first ends pushing away the ends of the vertical beams 42 and 45 and making the local region of the reflective surface 3 more concave. Linear actuator 5020 acts similarly on struts 53 and 56 and actuator 5030 on struts 54 and 57 to raise or depressed regions of the surface 3 local to these struts.

FIG. 14A shows in detail the truss structure used in this embodiment to make radial beam 44, and to make the other identical beams 41, 41, 43, 45, and 46. All are joined at the center to each other and to strut the center beck strut 51. Beam 44 extends out to join tangential beams 403 and 404 at a corner of the frame 4. The heights of the eight vertical struts 441-448 extending from center to perimeter along the radial beam 44 are deliberately reduced with increasing radial distance, to increase beam stiffness close to the central strut 51. This is done so that actuation of the back-bracing struts 52-57 can be used to induce more accurately uniform curvature across the diagonal of the hexagonal frame 4 needed for bending in the mode $z=k_1(x^2+y^2)$.

FIG. 14B shows in detail the structure used in this embodiment for the tangential beam 403, and for the identical tangential beams 401, 402, 404, 405, and 406. The height of this beam is reduced at the center 4032, so that actuation of the back bracing struts 52-57 will induce more accurately the bending modes of astigmatism, $z=k_2(x^2-y^2)$ and $z=2k_3xy$.

In order to maximize the accuracy of bending in all or any of the three bending modes obtainable by the structure 4 of this invention, the heights of the verticals 441-448 of the truss 44 and the central reduction in thickness of the beam 403 can be optimized by finite element analysis. The dimensions in of the beams shown in FIGS. 14A and 14B were so optimized using an ANSYS model, and are drawn to scale. In the analysis, beams 44 and 403 which are 3.6 m in length were built up from 1×1×0.04 inch square tube. The radials between trusses were 2×1×0.04 inch rectangular tubes, the mirror pucks/axial supports 3-inch long×1 in diameter and the actuators and diamond struts as 4 in ×0.06 in round steel tube. The segmented glass reflector surface was included also in the model. The total weight of the 4 mm thick glass segments is 338 kg. The total mass of the glass and structural steel in the model is 687 kg, or 13.9 kg/m², with the steel component weighing a total of 350 kg.

Figure 15:
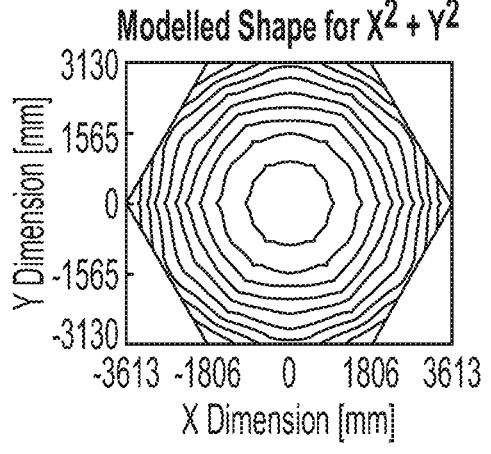
FIG. 15 shows an ANSYS model of the surface contours for three bending modes according to an embodiment of the present invention.
Figure 15:
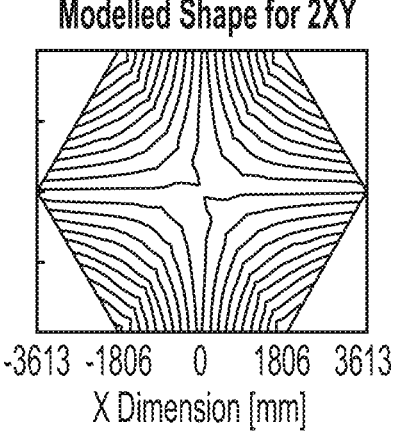
Figure 15:
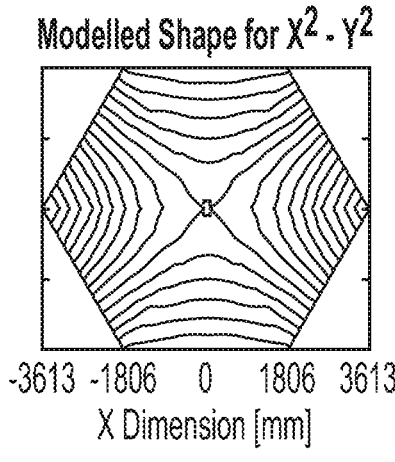

FIG. 15 shows the results obtained from the model of this optimized embodiment of the invention using the three actuators to deform the structure into the three key bending mode shapes indicated. The contour maps of the change in surface shape given for each of the desired three bending functions are shown at intervals of 1 mm.

Imaging Performance Obtainable Through the Day by Active Shape Adjustment

FIGS. 16A-16L show the solar imaging performance obtainable through the day by active shape adjustment of the specific alt-azimuth mounted hexagonal structure of the embodiment shown in FIG. 12, FIG. 13 and FIGS. 14A and 14B. The representative target location is taken to be 220 m due east of the heliostat on a tower of height 76 m. The analysis is made for selected hours of a representative day, chosen to be the equinox. The toroidal shape built-in to the reflector by initial placement of the supporting pads 420, with no bending forces applied by the struts 51-58, was that required for good imaging at 2:30 pm when the angle of incidence is 46°. Table 1 lists for each hour of the day the solar elevation, the angle of incidence of sunlight reflected by the heliostat and the mirror elevation. The angle of incidence on the reflecting surface varies from nearly normal incidence in the early morning, when the light is reflected back to the east, to 67° in the late afternoon when the sun is low in the west. Table 1 also lists the amplitude of the curvature and two astigmatism bending modes that must be applied to obtain the ideal toroidal heliostat shape to focus sunlight onto the target, normalized to unity for the spherical curvature for the sun at normal incidence, as obtained from equation 3 above.

FIGS. 16A-16L show the different images obtained at representative times early and late in the day, 7:30 am, 2:30 μm, 4:30 pm and 5:30 pm, corresponding the solar elevations of 12°, 51°, 29° and 17° degree and angles of incidence of 4° to 72°.

FIGS. 16A-16D and 16E-16H show for each listed hour the improvement in sunlight concentration at the receiver that results from the ANSYS optimized active adjustments reflector shape, calculated by ray tracing. FIGS. 16A-16D show the sunlight at the receiver if the shape were fixed at the 2:30 shape, while FIGS. 16E-16H show the sunlight at the receiver if the heliostat is actively changed by the modeled actuated shape changes of FIG. 15. The reference squares drawn in FIGS. 16A-16D and 16E-16H are drawn with sides measuring √2 times the diameter of the solar disc imaged at 233 m focal length, namely 2.87 m. The improvement in concentration is quantified in FIGS. 16I-16L, which show the fraction of the total reflected sunlight that falls within squares of different size—the ensquared energy. For the reference squares as drawn in FIGS. 16E-16H the ensquared energy is ≥99% for three of the four images shown, i.e. the spillage is ≤1% except for the case of very high, 72° angle of incidence, when the acceptance drops to 95%. By contrast, without active shape adjustment the spillage approaches or exceeds 50% at the times shown other than the 2:30 hour chosen to require no shape correction.

As an example of high concentration achieved on a cylindrical central receiver with a relatively small number of heliostats according to this specific embodiment, such a system would be suitable for collection heat for industrial processes or for a small CSP electrical generator, for example. In this example 776 heliostats of total mirror area 37,000 m² are set out in a field of 440 m in diameter, a mirror to field area ratio of ⅓. The cylindrical receiver at 76 m elevation is made with a surface area of 19.2 m², equal to $2\pi$ times the square of the ideal solar disc diameter, the same ratio of receiver to total mirror area as for the cylindrical receivers centered in large CSP heliostat fields. The ratio of mirror to receiver area is thus 1,900, twice that achieved in those fields with very much larger numbers of unfocused heliostats. The high concentration can allow for heating of thermal transfer or storage fluids to temperatures of 1000° C. or more, as needed for many industrial processes. For a solar direct normal incidence input flux of 1 kW/m², the sunlight energy delivered to the focus, allowing for 30% reduction from cosine factor, blocking and reflectivity loss of 30%, is 25 MW.

Embodiment 3 with Lightweight Spaceframe Mounting Structure

Figure 17:
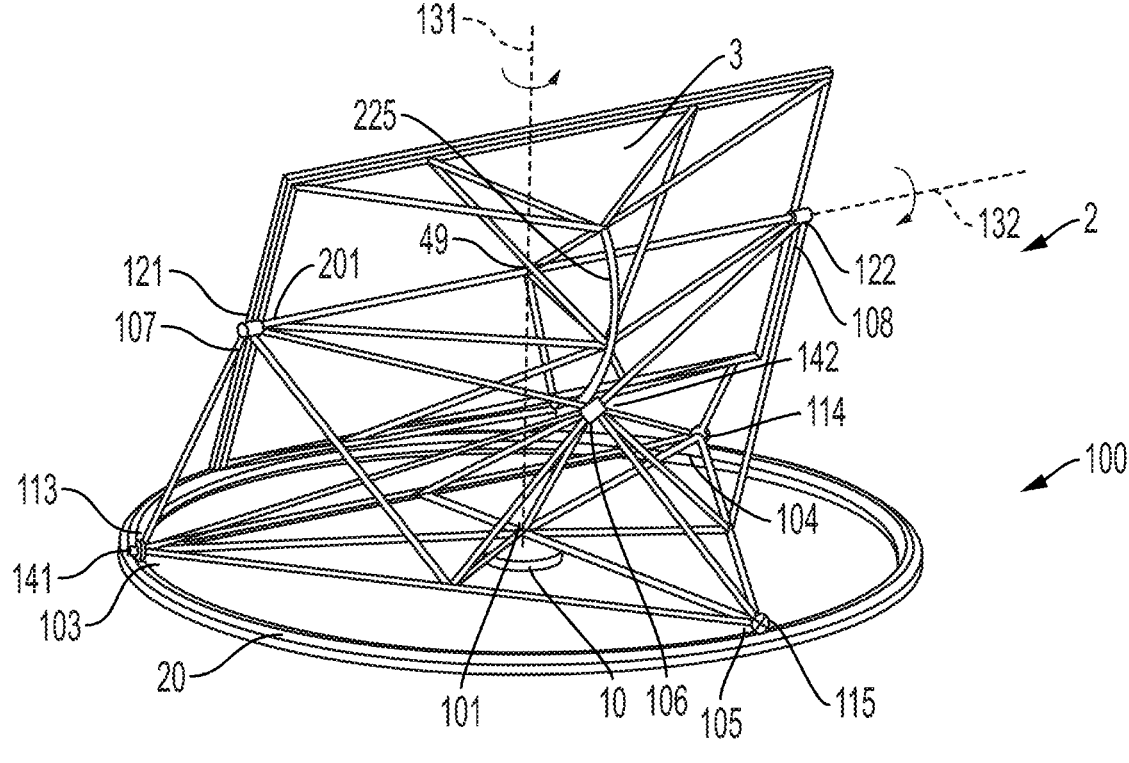
FIG. 17 is a schematic illustration of a third embodiment with an alt-azimuth mount made as a lightweight spaceframe structure according to an embodiment of the present invention.

FIG. 17 is a perspective view of another embodiment of the current invention showing a heliostat which takes advantage of the high stiffness of the back-braced reflector assembly 2 of an embodiment of this invention to use an alt-azimuth mount 6 made also as a lightweight spaceframe structure. The dual axis mount 6 includes a lower spaceframe structure 100 that turns on a track 20, The reflecting structure 2 is supported by elevation bearings 121 and 122 at the two ends of the elevation axis 132 instead of from the middle 49. Elevation motion is realized by inclusion of a drive arc 225 in the reflector supporting structure.

The spaceframe alt-azimuth mount 6 comprising a ground anchor 10, circular ground track 20 and two separate rigid spaceframe structures, a rigid lower spaceframe structure 100 and an upper structure 2. The reflecting surface 3 of the heliostat is carried by the upper structure 200. The lower rigid triangular lower spaceframe structure 100 has three lower corner nodes, 103, 104 and 105, a lower central node 101, at or near the triangle center, and three upper nodes, 106, 107 and 108 supported by struts rising from the base triangle. A central connection assembly connects the lower spaceframe structure 100 at said the lower central node 101 to the ground anchor 10. Three corner wheels 113, 114 and 115 located at the three lower corner nodes, 103, 104 and 105 ride on the ground track 20, supporting and driving in rotation by drive motor assembly 141 the heliostat 1 about a near vertical axis of rotation 131 defined by the ground anchor 10 and track 20.

The heliostat 1 further comprises a rigid upper spaceframe structure 2 hinged about an approximately horizontal axis 132 between bearings 121 and 122 at nodes 107 and 108 of the lower structure 100. The upper spaceframe structure 2 is configured to be driven about axis 132 by a second drive motor supported by the central upper node 106 of the rigid triangular lower spaceframe structure 100.

Figure 18:
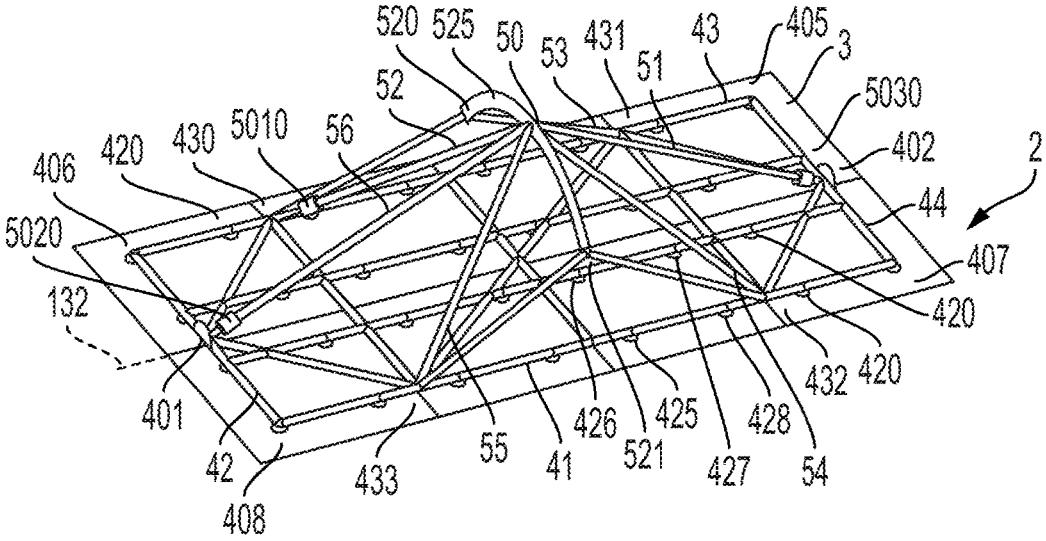
FIG. 18 is a schematic illustration of a deformable elevation spaceframe structure with bracing struts and drive arc according to an embodiment of the present invention.

FIG. 18 shows an embodiment of the reflector assembly structure 2 according to this invention in the form of a spaceframe structure. The spaceframe is supported from the lower structure 100 of the dual axis tracker 1 at end nodes 401 and 402, by bearings 121 and 122 at either end of the near-horizontal axis 132. In a particular form, the structure 2 comprises:

a rectangular deformable frame 4 of four beams 41, 42, 43, and 44 to which the reflector surface 3 is attached,
a set of four struts 52, 53, 54 and 55 extending from the nodes 430, 431, 432 and 433 at the corners of the frame 4 to a central node 50 behind,
two more struts, 56 and 57, extending from the central back node 50 down to end support nodes 401 and 402;

an elevation drive arc 525, supported at the central back node 50 and by struts from nodes at each end of the arc: from arc-end 520 to nodes 430 and 431 and from arc-end 521 to nodes 432 and 433.

High overall stiffness of the reflector assembly structure 2 is achieved because its core structure of nine struts connecting five nodes together form two tetrahedra that share a common triangular base. This base is formed by three struts between the nodes 431, 433 and 50. The two tetrahedra are formed by three struts each extending from this triangular base out to each of the nodes 430 and 432. One of these struts, connecting nodes 430 and 50 incorporates a linear actuator 5010 so that its length can be actively adjusted. In this way nominally coplanar nodes 430, 431, 432 and 433 may be moved out of plane, and thus the nominally planar rectangular structure 4, and the heliostat reflecting surface 2 that it supports, may be twisted to change the shape according to the astigmatism bending mode $z_2$ (x,y).

Two additional actuators are incorporated into the structure 2 to bend the rectangular structure 4 in a different way. Thus the left end node 401 may be moved up or down by operating the linear actuator 5020 incorporated into the strut 56 connecting nodes 401 and 50. Similarly, the right end node 402 may be moved up or down by operating the linear actuator 5030 incorporated into the strut connecting nodes 402 and 50. These added motions allow active shape change according to the function $z_1$ $(x^2-y^2)$.

A specific dimensioned embodiment of this invention is a heliostat carrying a reflective surface 3 with total area of 21.8 m², comprising eight back-silvered glass mirrors, each a square 1.65 m on a side and 4 mm thick, the total glass weight being 218 kg. Quantitative optimization and evaluation of a dimensioned deformable heliostat upper structure as in FIG. 18 to support these reflectors has been made using finite element analysis. The upper structure 2 for this embodiment model is drawn to scale in FIG. 18. The struts shown are thin wall steel tubes of circular and rectangular cross section. Each of the 8 glass mirror segments is supported by 4 pads 420 in a square as shown with corners 425, 426, 427 and 428, on sub-struts from the flat rectangular sub-structure. The total weight of the steel in the upper structure in the finite element model of this embodiment is 164 kg.

The value of being able to actively control the shape of a heliostat mirror array in this way to reduce spillage may be understood by consideration of a specific quantitative example of the above heliostat used in a 200 m diameter collection field of a central receiver solar generator. The performance is modeled for the case of a receiver at 30 m height above that of the heliostat reflectors, for the case that the heliostat is centrally located 100-m north of the tower. The overall fixed shape of the reflector, before actuation, is ideally spherical with 200 m radius of curvature (100 m focal length). The individual segments may be shaped with this radius, and the overall shape may be set to the same radius by canting of its 8 individual reflector segments.

Figures 19A, 19B, 19C, 19D:
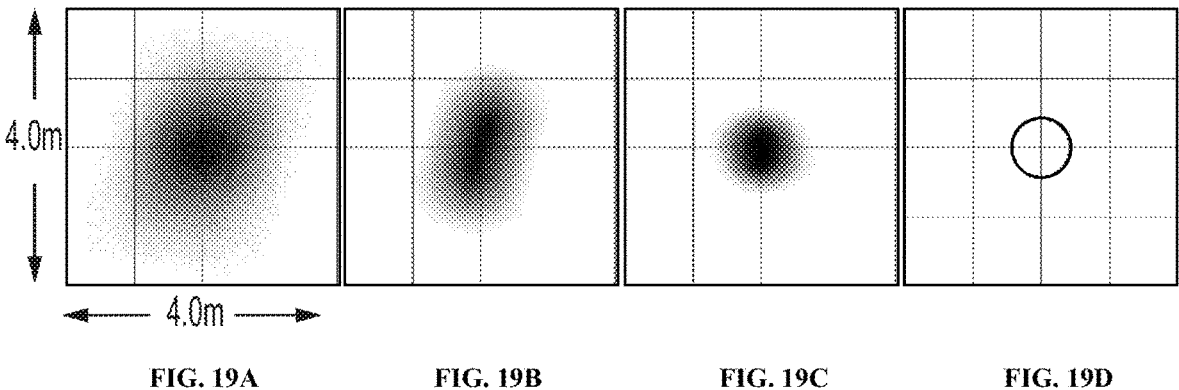
FIG. 19 shows distribution of sunlight reflected by the modeled heliostat to a tower-mounted receiver for (a) canted flat segments (b) canted spherical segments, (c) with active frame shape adjustment (d) ideal solar image according to embodiments of the present invention.

FIG. 19 shows the spread of sunlight reflected by the heliostat under different orientations and adjustment of the reflector shape. The ideal case will be in winter at noon in winter when the sunlight strikes the heliostat and close to normal incidence, and is reflected directly back to the receiver. If then the heliostat reflecting surface is accurately spherical, then a sharp image of the sun 0.8 m diameter will be formed on the receiver, as in FIG. 19, panel (d).

If, however, as an example, on a summer morning with the sun is in the cast, and sunlight is incident on the heliostat at 45°, the light reflected onto the receiver will be to some extent spread out, depending on the heliostat shape. FIG. 19 panel (a) shows the illumination for the case of individually flat reflector segments, with fixed canting to be tangent to the ideal 200 m radius sphere. There is a lot of spillage even for a receiver disc 2 m. FIG. 19, panel (b) shows the case in which the facets are individually curved for 100 m focal length, so the heliostat surface is accurately spherical. In this case the light receiver by the receiver is less spread out, but is distinctly elongated. The spillage is reduced, but is still significant because of astigmatic aberration. FIG. 19, panel (c) shows a major reduction of spillage achieved by actuation of the heliostat of this invention with the astigmatic correction capability shown in FIG. 18 and FIG. 19 above. The elongation is removed, and the spread of light is much reduced, getting close to the limiting concentration for the ideal solar image shown in FIG. 19, panel (d).

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A heliostat, comprising:
a reflecting surface;
an elastically deformable frame on which the reflecting surface is mounted;
a truss structure behind said elastically deformable frame comprising at least four bracing struts with first ends attached to said elastically deformable frame and second ends attached to at least one node located centrally behind the elastically deformable frame;
at least one actuator connected to at least one of said at least four struts at said at least one node;
an electronic control system configured to communicate with said least one actuator; and
a dual-axis mount to support and orient the reflecting surface, the elastically deformable frame, the truss structure and the at least one actuator forming an assembly,
wherein actuation of said at least one actuator in response to said electronic control system causes compression or tension of at least one of said at least four bracing struts to thereby control a shape of said reflecting surface and said elastically deformable frame in at least low order bending modes.

2. The heliostat of claim 1, wherein said electronic control system is configured to control said at least one actuator in bending modes that are actively controlled through a day so as to maintain in focus sunlight reflected onto a fixed distant fixed target including during changing orientation of the heliostat and angles of sunlight reflection.

3. The heliostat according to claim 1, wherein said reflecting surface attached to the said elastically deformable frame has a first shape when said at least one actuator is in a relaxed, un-extended and un-retracted configuration, said first shape being a concave toroidal shape.

4. The heliostat according to claim 3, wherein said first shape corresponds approximately to a solar energy-weighted average of all shapes required for said heliostat to focus on said target through a year, and
wherein a total range of actuation is minimized.

5. The heliostat according to claim 3, wherein extension or retraction of said at least one actuator reconfigures said reflecting surface shape to concave, toroidal shapes different from said first shape in any or all of their first, shorter focal length, second longer focal length and in an angle of rotation made by an axis of the first, shorter focal length to the reflecting surface.

6. The heliostat of claim 3, wherein said reflecting surface comprises at least one initially flat segment of back-silvered glass that is rigidly attached to said deformable frame at a plurality of attachment points so as to be tilted and bent to conform to said first shape.

7. The heliostat of claim 1, wherein said at least low order bending modes include spherical curvature and two orthogonal astigmatism modes such that a displacement z perpendicular to a supporting frame at position (x,y) in a plane of the reflecting surface is given approximately by $z = a_1(x2+y2) + a_2xy + a_3(x2-y2)$ where $a_1$, $a_2$ and $a_3$ are adjustable coefficients.

8. The heliostat of claim 7, wherein said reflecting surface and said elastically deformable frame are rectangular,
wherein said at least four bracing struts are nine rigid, stiffening back struts that extend from first ends at the four corners of said elastically deformable frame, four centers of sides of said elastically deformable frame and from an overall rectangle center of said elastically deformable frame, each of said nine rigid, stiffening back struts extending at second ends to said at least one node;
wherein said at least one actuator is at least four actuators connected to said nine rigid, stiffening back struts at said at least one node; and
wherein by extending or retracting the at least four actuators a shape of said reflecting surface is changeable independently in one or more of said spherical curvature and two orthogonal astigmatism modes.

9. The heliostat of claim 7, wherein said reflecting surface is hexagonal,
wherein said elastically deformable frame has primary structural elements comprising six coplanar radial beams connected at a perimeter by six tangential beams;
where said at least four bracing struts are seven rigid, stiffening back struts extending from first ends at six perimeter corners of a hexagon and one from a center of the hexagon to said at least one node;
wherein second ends of said seven rigid, stiffening back struts are connected to three linear actuators; and
wherein said three linear actuators are operable to change said shape of said reflecting surface independently in independently in one or more of said spherical curvature and two orthogonal astigmatism modes in any combination of amplitudes.

10. The heliostat of claim 9, wherein said supporting frame comprises primary radial and tangential beams that are constructed as truss beams of variable height, optimized so that the shape deformation resulting from actuation most closely approximates one or more of said spherical curvature and two orthogonal astigmatism modes.

11. The heliostat of claim 1, wherein said at least low order bending modes are actively controlled through a day so as to correct for low order deformation of a structure of said heliostat caused by varying gravitational or wind forces.

12. The heliostat according to claim 1, wherein said controller is further configured to communicate with said at least one actuator to deform said elastically deformable frame in response to the changing orientation of said dual axis tracking heliostat relative to the sun so as to increase a concentration and reduce a spillage of sunlight reflected by the heliostat onto a receiving surface or aperture.

13. The heliostat of claim 12, wherein said controller is further configured so that shape changes to be applied at any hour of any day are derived from optical code and are expressed in terms of amplitudes of orthogonal low order bending modes, each mode requiring given actuator settings, and said at least one actuator is commanded to these settings, obtained by algebraic addition of the displacements required for individual orthogonal modes.

14. The heliostat of claim 1, further comprising a fixed ground structure, wherein said dual-axis mount comprise a lower rigid rotating structure configured to turn on said fixed ground structure about a first, substantially vertical axis, and having two spaced bearings that define a second, substantially horizontal axis, and wherein said reflecting surface, elastically deformable frame and truss structure is supported by said bearings and are rotatable to be turned from said lower structure about a second substantially horizontal axis.

15. The heliostat according to claim 14, wherein said elastically deformable frame is rectangular, wherein said plurality of bracing struts includes four approximately coplanar nodes in a rectangle in said elastically deformable frame, a central node set behind said elastically deformable frame, and two end nodes, close to said spaced bearings and defining an elevation axis, whereon three of said struts incorporate linear actuators so as to be adjustable in length such that two struts connect said back node to said two end nodes and one of said four struts connect said back node to said four nodes in said rectangle in said mirror support frame, and and wherein a shape of said reflecting surface may be altered to induce astigmatic bending with shape change approximating the forms $z \propto (x^2 + y^2)$ and $z \propto xy$, by adjusting lengths of said linear actuators.

16. The heliostat according to claim 15 in which said assembly further comprises:

a drive arc centered on said second approximately horizontal axis defined by separated elevation bearings and supported by from at least one of said plurality of struts; and a geared drive motor supported by said lower rotating structure and operational to turn said drive arc.

\* \* \* \* \*